(12) United States Patent
Gutman et al.

(10) Patent No.: US 12,192,772 B2
(45) Date of Patent: Jan. 7, 2025

(54) TECHNIQUES FOR CONFIGURING PHYSICAL LAYER SIGNATURE FEEDBACK IN WIRELESS COMMUNICATIONS

(71) Applicant: QUALCOMM Incorporated, San Diego, CA (US)

(72) Inventors: Igor Gutman, Hod HaSharon (IL); Yavuz Yapici, Florham Park, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/945,315

(22) Filed: Sep. 15, 2022

(65) Prior Publication Data

US 2024/0098497 A1  Mar. 21, 2024

(51) Int. Cl.
*H04W 12/122* (2021.01)
*H04W 12/40* (2021.01)

(52) U.S. Cl.
CPC ......... *H04W 12/122* (2021.01); *H04W 12/40* (2021.01)

(58) Field of Classification Search
CPC ... H04W 12/08; H04W 12/10; H04W 12/108; H04W 12/12; H04W 12/121; H04W 12/122; H04W 12/40
See application file for complete search history.

(56) References Cited

U.S. PATENT DOCUMENTS

| | | | |
|---|---|---|---|
| 8,433,894 B2* | 4/2013 | Reznik | H04W 12/122 370/252 |
| 9,398,123 B2* | 7/2016 | Vermani | H04W 28/065 |
| 9,739,868 B2* | 8/2017 | Baxley | H04W 12/08 |
| 10,104,098 B2* | 10/2018 | Baxley | H04K 3/42 |
| 11,811,434 B2* | 11/2023 | Jeong | H04W 52/18 |

* cited by examiner

*Primary Examiner* — Hosuk Song
(74) *Attorney, Agent, or Firm* — Dalei Dong; Holland & Hart LLP

(57) ABSTRACT

Methods, systems, and devices for wireless communications are described for physical layer signature feedback to enhance security in wireless communications. A user equipment (UE) and a network entity may apply a physical layer signature, such as an artificial physical layer impairment, to one or more physical layer signals that may be measured to identify a physical layer signature of the associated physical layer signal. The UE, upon receipt of a physical layer signal, may check if the identified signal includes a physical layer signature of a set of valid physical layer signatures. If the received physical layer signature matches a valid physical layer signature, the UE may operate in accordance with procedures associated with the signal. If the received physical cal layer signature does not match a valid physical layer signature, the UE may transmit a message to the network entity that indicates an unmatched physical layer signature.

30 Claims, 19 Drawing Sheets

TECHNIQUES FOR CONFIGURING PHYSICAL LAYER SIGNATURE FEEDBACK IN WIRELESS COMMUNICATIONS

FIELD OF TECHNOLOGY

The following relates to wireless communications, including techniques for configuring physical layer signature feedback in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, wireless communications may be encrypted using cryptographic algorithms to protect the enclosed data. Due to latency considerations, some wireless communications systems may encrypt higher layer signaling (e.g., Layer 3 communications, such as radio resource control (RRC) signaling) and may not encrypt other wireless signaling (e.g., Layer 1 signaling, which may be physical layer signaling). Techniques to enhance security of lower layer signaling may be desirable to provide improved reliability and robustness against potential aggressors.

SUMMARY

The described techniques relate to improved methods, systems, devices, and apparatuses that support techniques for configuring physical layer signature feedback in wireless communications. For example, the described techniques provide for a user equipment (UE) and a network entity may apply a physical layer signature (e.g., an artificial physical layer impairment, such as an amplitude-to-amplitude modulation (AM/AM) or amplitude-to-phase modulation (AM/PM) impairment or in-phase/quadrature (IQ) mismatch) to one or more physical layer signals. For example, the UE, upon receipt of a physical layer signal, may check if the identified signal includes a physical layer signature of a set of valid physical layer signatures. If the received physical layer signature matches a valid physical layer signature, the UE may operate in accordance with procedures associated with the signal. Alternatively, if the received physical layer signature does not match a valid physical layer signature, the UE may transmit a message to the network entity that indicates a physical layer signature estimation of the unmatched physical layer signature. The UE may receive an indication from the network entity that the physical layer signature is valid, and may add the signature to the set of valid signatures; or may receive an indication that the signature is invalid and the UE may ignore the physical layer signal.

A method for wireless communication at a user equipment (UE) is described. The method may include receiving configuration information for at least one physical layer signal that is modified by a physical layer signature, the physical layer signature is associated with a set of parameters that are applied to the physical layer signal, generating a set of estimated parameters of a received physical layer signature of a received physical layer signal, identifying a mismatch between the set of estimated parameters of the received physical layer signature and the set of parameters provided in the configuration information, and transmitting, based on the identified mismatch, the set of estimated parameters of the received physical layer signature to a network entity.

An apparatus for wireless communication at a UE is described. The apparatus may include a processor, memory coupled with the processor, and instructions stored in the memory. The instructions may be executable by the processor to cause the apparatus to receive configuration information for at least one physical layer signal that is modified by a physical layer signature, the physical layer signature is associated with a set of parameters that are applied to the physical layer signal, generate a set of estimated parameters of a received physical layer signature of a received physical layer signal, identify a mismatch between the set of estimated parameters of the received physical layer signature and the set of parameters provided in the configuration information, and transmit, based on the identified mismatch, the set of estimated parameters of the received physical layer signature to a network entity.

Another apparatus for wireless communication at a UE is described. The apparatus may include means for receiving configuration information for at least one physical layer signal that is modified by a physical layer signature, the physical layer signature is associated with a set of parameters that are applied to the physical layer signal, means for generating a set of estimated parameters of a received physical layer signature of a received physical layer signal, means for identifying a mismatch between the set of estimated parameters of the received physical layer signature and the set of parameters provided in the configuration information, and means for transmitting, based on the identified mismatch, the set of estimated parameters of the received physical layer signature to a network entity.

A non-transitory computer-readable medium storing code for wireless communication at a UE is described. The code may include instructions executable by a processor to receive configuration information for at least one physical layer signal that is modified by a physical layer signature, the physical layer signature is associated with a set of parameters that are applied to the physical layer signal, generate a set of estimated parameters of a received physical layer signature of a received physical layer signal, identify a mismatch between the set of estimated parameters of the received physical layer signature and the set of parameters provided in the configuration information, and transmit, based on the identified mismatch, the set of estimated parameters of the received physical layer signature to a network entity.

Some examples of the method, apparatuses, and non-transitory computer-readable medium described herein may further include operations, features, means, or instructions for comparing the set of estimated parameters of the received physical layer signature to a set of multiple valid sets of physical layer signature parameters, and where the set of estimated parameters are transmitted to the network entity based on the set of estimated parameters being absent from the set of multiple valid sets of physical layer parameters.

In some examples of the method, apparatuses, and non-transitory computer-readable medium described herein, the transmitting the set of estimated parameters of the received physical layer signature may include operations, features, means, or instructions for transmitting a medium access control (MAC) control element, or radio resource control (RRC) signaling, that indicates the set of estimated parameters of the received physical layer signature. In some examples of the method, apparatuses, and non-transitory computer-readable medium described herein, the set of estimated parameters of the received physical layer signature include one or more amplitude parameters, one or more phase parameters, one or more frequency parameters, or any combinations thereof. In some examples of the method, apparatuses, and non-transitory computer-readable medium described herein, the set of estimated parameters include one or more of an amplitude vector of an amplitude-to-amplitude modulation (AM/AM) physical layer signature applied to the received physical layer signal, a phase vector of an amplitude-to-phase modulation (AM/PM) physical layer signature applied to the received physical layer signal, a set of vectors of impulse responses of a frequency domain residual sideband (FDRSB) estimation of the received physical layer signal, or any combinations thereof.

In some examples of the method, apparatuses, and non-transitory computer-readable medium described herein, the set of estimated parameters include an indication of a resource allocation associated with the received physical layer signal. In some examples of the method, apparatuses, and non-transitory computer-readable medium described herein, the indication of the resource allocation associated with the received physical layer signal includes one or more of a system frame number, a subframe number, a slot index, a symbol index, a bandwidth part (BWP), a resource block (RB) offset within the BWP, a number of RBs, a receive beam index, or any combinations thereof. In some examples of the method, apparatuses, and non-transitory computer-readable medium described herein, the set of estimated parameters may be provided for verification at the network entity of a validity of the received physical layer signal.

Some examples of the method, apparatuses, and non-transitory computer-readable medium described herein may further include operations, features, means, or instructions for receiving, from the network entity, an indication that the received physical layer signature is a valid signature or an invalid signature. Some examples of the method, apparatuses, and non-transitory computer-readable medium described herein may further include operations, features, means, or instructions for receiving, from the network entity, an indication of a time period associated with the indication that the received physical layer signature is a valid signature, where the received physical layer signature is considered invalid after an expiration of the time period. Some examples of the method, apparatuses, and non-transitory computer-readable medium described herein may further include operations, features, means, or instructions for adding the received physical layer signature to a list of valid physical layer signatures at the UE.

A method for wireless communication at a network entity is described. The method may include transmitting configuration information to a UE for at least one physical layer signal that is modified by a physical layer signature, the physical layer signature associated with a set of parameters that are applied to the physical layer signal, receiving, from the UE, a set of estimated parameters of a received physical layer signature received at the UE, and transmitting, to the UE, an indication that the set of estimated parameters is associated with a valid physical layer signature or an invalid physical layer signature based on whether the set of estimated parameters corresponds to a neighboring physical layer signature of one or more neighboring network entities.

An apparatus for wireless communication at a network entity is described. The apparatus may include a processor, memory coupled with the processor, and instructions stored in the memory. The instructions may be executable by the processor to cause the apparatus to transmit configuration information to a UE for at least one physical layer signal that is modified by a physical layer signature, the physical layer signature associated with a set of parameters that are applied to the physical layer signal, receive, from the UE, a set of estimated parameters of a received physical layer signature received at the UE, and transmit, to the UE, an indication that the set of estimated parameters is associated with a valid physical layer signature or an invalid physical layer signature based on whether the set of estimated parameters corresponds to a neighboring physical layer signature of one or more neighboring network entities.

Another apparatus for wireless communication at a network entity is described. The apparatus may include means for transmitting configuration information to a UE for at least one physical layer signal that is modified by a physical layer signature, the physical layer signature associated with a set of parameters that are applied to the physical layer signal, means for receiving, from the UE, a set of estimated parameters of a received physical layer signature received at the UE, and means for transmitting, to the UE, an indication that the set of estimated parameters is associated with a valid physical layer signature or an invalid physical layer signature based on whether the set of estimated parameters corresponds to a neighboring physical layer signature of one or more neighboring network entities.

A non-transitory computer-readable medium storing code for wireless communication at a network entity is described. The code may include instructions executable by a processor to transmit configuration information to a UE for at least one physical layer signal that is modified by a physical layer signature, the physical layer signature associated with a set of parameters that are applied to the physical layer signal, receive, from the UE, a set of estimated parameters of a received physical layer signature received at the UE, and transmit, to the UE, an indication that the set of estimated parameters is associated with a valid physical layer signature or an invalid physical layer signature based on whether the set of estimated parameters corresponds to a neighboring physical layer signature of one or more neighboring network entities.

Some examples of the method, apparatuses, and non-transitory computer-readable medium described herein may further include operations, features, means, or instructions for comparing the set of estimated parameters to a set of multiple valid sets of physical layer signature parameters, and where the indication that the set of estimated parameters is associated with an invalid physical layer signature is based on the estimated parameters being absent from the set of multiple valid sets of physical layer parameters.

In some examples of the method, apparatuses, and non-transitory computer-readable medium described herein, the receiving set of estimated parameters may include operations, features, means, or instructions for receiving a MAC control element, or RRC signaling, that indicates the set of estimated parameters. In some examples of the method, apparatuses, and non-transitory computer-readable medium described herein, the set of estimated parameters of the received physical layer signature include one or more of an amplitude vector of an AM/AM physical layer signature applied to the received physical layer signal, a phase vector of an AM/PM physical layer signature applied to the received physical layer signal, a set of vectors of impulse responses of a FDRSB estimation of the received physical layer signal, or any combinations thereof.

In some examples of the method, apparatuses, and non-transitory computer-readable medium described herein, the estimated physical layer signature parameters include an indication of a resource allocation associated with the received physical layer signature received at the UE. In some examples of the method, apparatuses, and non-transitory computer-readable medium described herein, the indication of the resource allocation associated with the received physical layer signature received at the UE includes one or more of a system frame number, a subframe number, a slot index, a symbol index, a BWP, an RB offset within the BWP, a number of RBs, a receive beam index, or any combinations thereof. Some examples of the method, apparatuses, and non-transitory computer-readable medium described herein may further include operations, features, means, or instructions for transmitting an indication of a time period associated with the indication that the set of estimated parameters is associated with a valid physical layer signature, where the received physical layer signature is considered invalid after an expiration of the time period.

DETAILED DESCRIPTION

Figure 1:
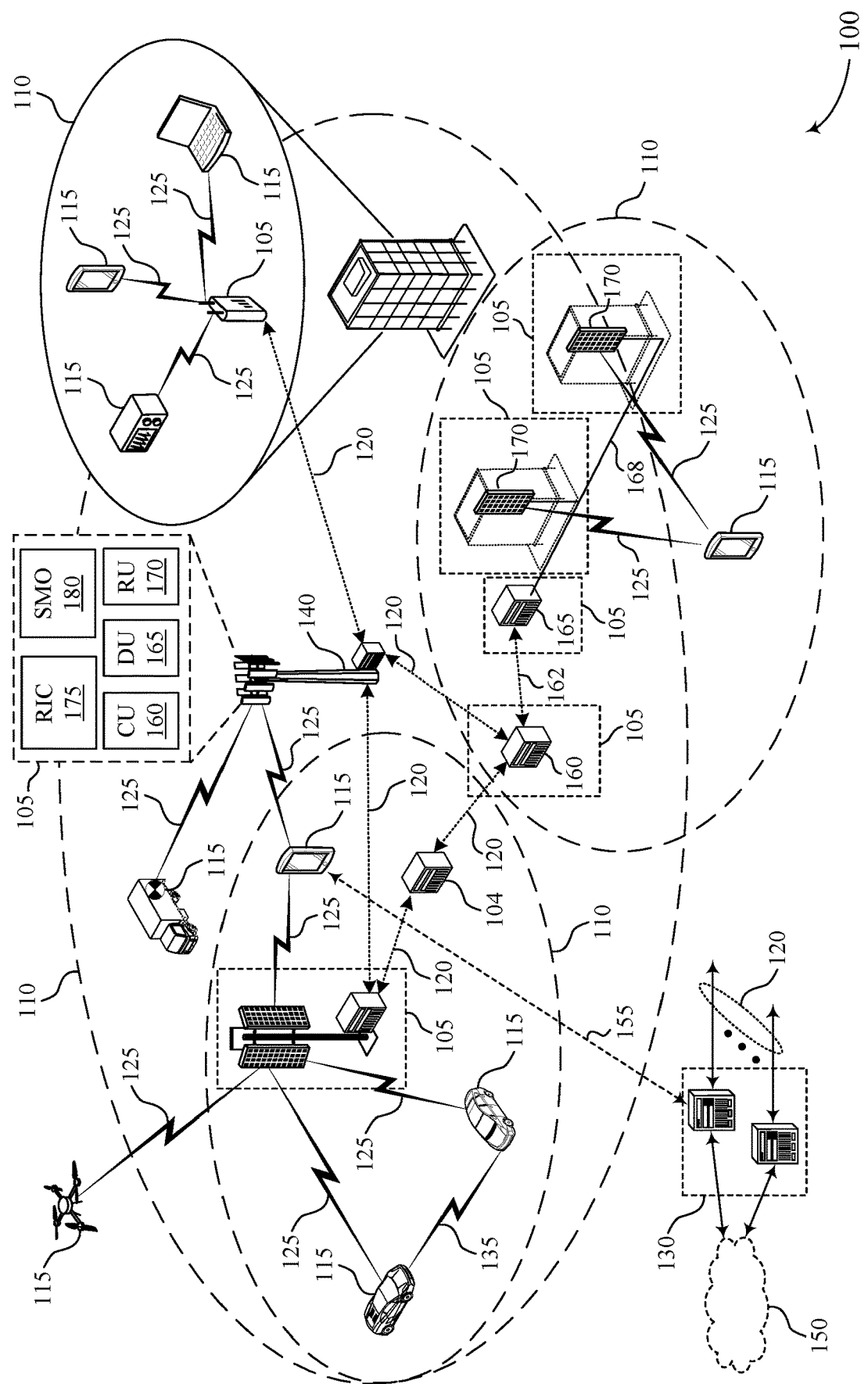
FIG. 1 illustrates an example of a wireless communications system that supports techniques for configuring physical layer signature feedback in wireless communications in accordance with one or more aspects of the present disclosure.

In some systems, wireless communications between devices may be secured based on encryption. For example, wireless signals and messages may be encrypted using cryptographic algorithms to protect the enclosed data. However, such cryptographic algorithms may increase overhead and may be susceptible to being hacked using quantum computing techniques, or other advanced computing techniques. Additionally, or alternatively, due to latency considerations associated with such encryption, some wireless communications systems may encrypt higher layer signaling (e.g., Layer 3 communications, such as radio resource control (RRC) signaling) and may not encrypt other wireless signaling (e.g., Layer 1 signaling, which may be physical layer signaling). If the cryptographic algorithms for the higher layer communications are hacked, communication reliability and throughput will decrease. As such, some systems and devices may place a relatively large load on the security of higher layer communications using relatively complex algorithms.

Techniques described herein provide for improved security of wireless communications with reduced complexity and overhead. For example, the described techniques support utilization of physical layer signatures to provide for increased security for wireless communications, including physical layer security. In some cases, a network entity may configure a user equipment (UE) with a set of one or more physical layer signatures that are associated with one or more physical layer signals. In some cases, the physical layer signature may be an artificial physical layer impairment, such as an amplitude-to-amplitude modulation (AM/AM) or amplitude-to-phase modulation (AM/PM) impairment or in-phase/quadrature (IQ) mismatch.

A UE may receive a physical layer signal, and determine whether the identified signal includes a physical layer signature of the set of valid physical layer signatures. If the received physical layer signature matches a physical layer signature of the set of physical layer signals, the UE may operate in accordance with procedures associated with the signal. In cases where the received physical layer signature does not match a valid physical layer signature, the UE may transmit a message to the network entity that indicates a physical layer signature estimation of the unmatched physical layer signature. The UE may receive an indication from the network that the physical layer signature is valid, and may add the signature to the set of valid signatures, or may receive an indication that the signature is invalid and the UE may ignore the physical layer signal. In some examples, the UE and network entity may determine the valid physical layer signatures by transmitting physical layer signature parameters via medium access control-control element (MAC-CE) or radio resource control (RRC) links.

Such techniques may allow for detection of potential aggressor devices that may seek to disrupt network access or performance in a wireless communications system. Such detection may enhance network reliability and security, reduce latency, and may be provided with relatively low power overhead.

Aspects of the disclosure are initially described in the context of wireless communications systems. Aspects of the disclosure are further illustrated by and described with reference to filter diagrams, process flows, apparatus diagrams, system diagrams, and flowcharts that relate to techniques for configuring physical layer signature feedback in wireless communications.

FIG. 1 illustrates an example of a wireless communications system 100 that supports techniques for configuring physical layer signature feedback in wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT MC), a Non-Real Time RIC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for configuring physical layer signature feedback in wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

As described herein, a UE 115 in the wireless communications system 100 may identify a source of a received signal based on a physical layer signature of a received physical layer signal. In some cases, a network entity 105 may configure a UE 115 with a set of one or more physical layer signatures that are associated with one or more physical layer signals, that the UE 115 may use to identify whether a signal is from a valid or potentially invalid source. In some cases, the physical layer signature may be an artificial physical layer impairment, such as an AM/AM or AM/PM impairment, or IQ mismatch. The UE 115 may receive the physical layer signal, and determine whether the identified signal includes a physical layer signature of the set of valid physical layer signatures. If the received physical layer signature matches a physical layer signature of the set of physical layer signals, the UE 115 may operate in accordance with procedures associated with the signal. In cases where the received physical layer signature does not match a valid physical layer signature, the UE 115 may transmit a message to the network entity 105 that indicates a physical layer signature estimation of the unmatched physical layer signature. In some cases, the UE 115 may receive an indication from the network entity 105 that the physical layer signature is valid, and may add the signature to the set of valid signatures. In other cases, the UE 115 may receive an indication that the signature is invalid and the UE 115 may ignore the physical layer signal.

Figure 2:
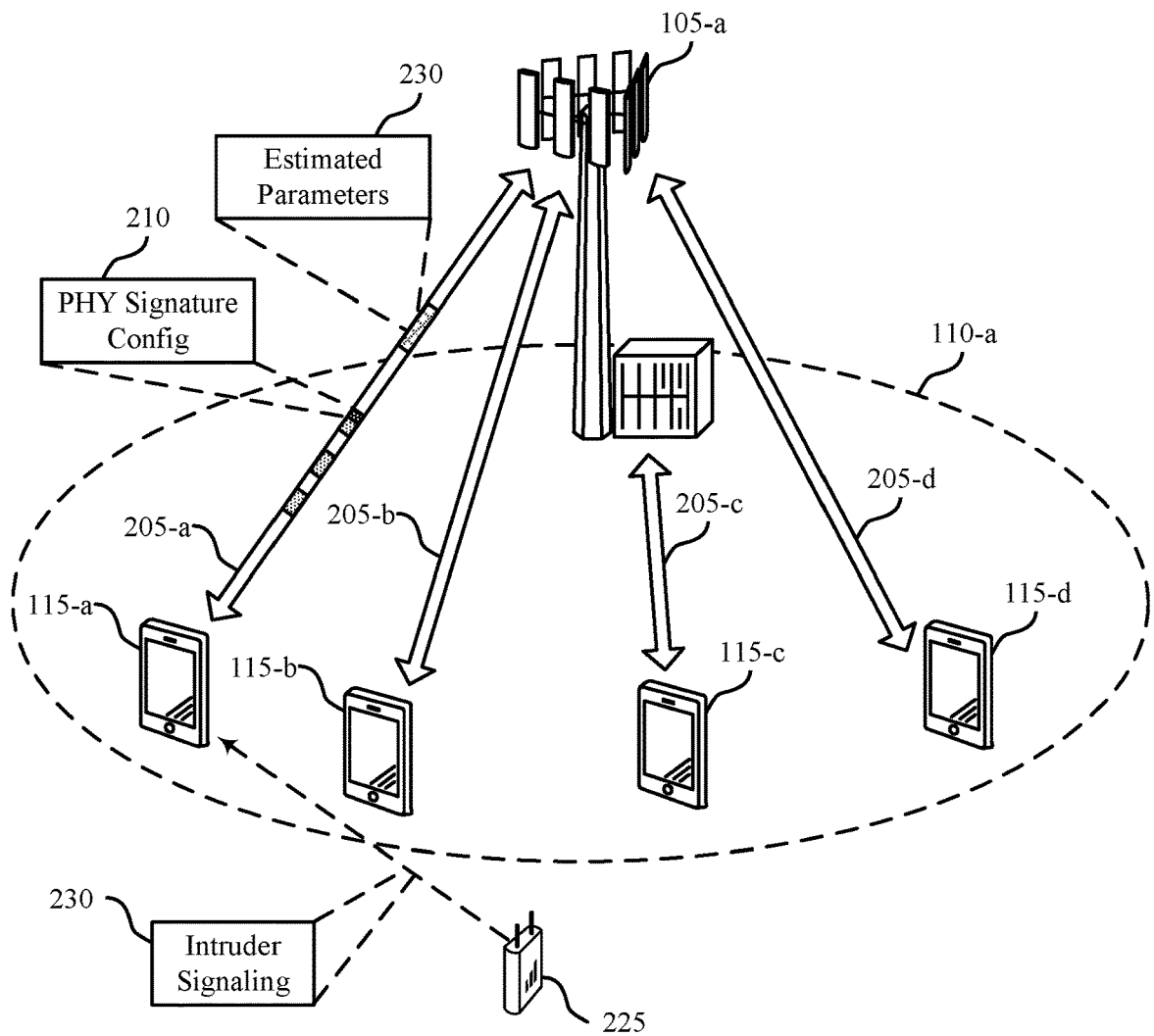
FIG. 2 illustrates an example of a wireless communications system that supports techniques for configuring physical layer signature feedback in wireless communications in accordance with one or more aspects of the present disclosure.

FIG. 2 illustrates an example of a wireless communications system 200 that supports techniques for configuring physical layer signature feedback in wireless communications in accordance with one or more aspects of the present disclosure. The wireless communications system 200 may implement or be implemented by aspects of the wireless communications system 100. For example, the wireless communications system 200 may include a network entity 105 a, and UEs 115-a, 115-b, 115-c, and 115-d, which may represent examples of corresponding devices as described with reference to FIG. 1. The network entity 105-a may communicate with each of the UEs 115-a, 115-b, 115-c, and 115-d within a geographic coverage area 110-a and via a respective communication link 205 (e.g., communication links 205-a, 205-b, 205-c, and 205-d). As described herein, the network entity 105 a may apply a physical layer signature to transmissions to the UEs 115, which may enhance security of the transmissions by identifying the network entity 105-a as a source of the transmissions.

Security of wireless communications may improve reliability and confidentiality of exchanged data. By securing a transmission, a device may protect confidential information enclosed in the transmission, such as information related to commercial applications (e.g., financial, medical, or pharmaceutical information), government organizations, military applications, personal data, and social networks, among other confidential and private information. In some wireless communications systems, link security may be performed using cryptography. For example, cryptographic algorithms may be used to provide security via higher layers (e.g., Layer 3 and above). Such cryptographic algorithms are relatively difficult and time consuming to hack (e.g., unbreakable).

However, a security key may be transmitted to use for decoding the cryptographic algorithms, which may increase overhead and latency. For example, a security key may include a relatively large quantity of bits (e.g., 256 or 128 bits), which may add overhead to relatively small data packets. Additionally, or alternatively, some quantum computing technologies may be developed which may be capable of reducing complexity associated with decoding (e.g., hacking) the cryptographic algorithms. Quantum mechanics may make use of superposition features and/or quantum bit features, which may exist in a combination of multiple states at a time. Such techniques may reduce a hacking complexity of an exhaustive search method, which may pose a risk to security of cryptographic algorithms.

Further, in order to reduce overhead and latency, some wireless communications may not be protected by cryptography (e.g., some scheduled downlink transmissions may not be protected by cryptography). Such downlink transmissions may include lower layer transmissions (e.g., Layer 1 or Physical Layer transmissions), such as a medium access control-control element (MAC-CE), a broadcast message (e.g., a system information block (SIB), paging information, or the like), or both. A transfer delay of a MAC-CE transmission may be more important than reliability of the transmission, in some cases. In such cases, one or more intruding devices 225 may challenge (e.g., hijack or hack) the unprotected transmissions. For example, an intruding device 225 may fabricate a transmission having a same format as the original (e.g., true) physical downlink control channel (PDCCH), physical downlink shared channel (PDSCH), physical uplink control channel (PUCCH), or physical uplink shared channel (PUSCH) transmission. Absent security on the transmissions, a UE 115 or other receiving device may not distinguish between a true transmission and a fabricated transmission of intruder signaling 230, which may reduce reliability and pose security threats.

In the example of FIG. 2, the intruding device 225 may transmit intruder signaling 230 that may be received at the UE 115-*a* (e.g., and/or one or more of the other UEs 115-*b*, 115-*c*, and 115-*d*). The UE 115-*a* may, in some cases, be unable to distinguish the intruder signaling 230 from one or more true signals 215 from the network entity 105-*a*.

An example of intruder signaling 230 may be a fabricated wake-up signal (WUS), which may be fabricated by intruding device 225 to drain battery power of one or more UEs 115. A WUS may be transmitted by a network entity 105 to a UE 115 via a PDCCH during discontinuous reception (DRX) communications. The WUS may indicate whether the UE 115 should stay on (e.g., in a wake state) to receive data or transition to a sleep state for a subsequent DRX on duration. A wake-up radio may be used for detection of the WUS. For example, the UE 115 may remain in a relatively low power state while monitoring for a WUS using the wake-up radio. The UE 115 may not enter a full power state until the UE 115 receives a WUS that instructs the UE 115 to wake up. Such wake-up techniques may be referred to as two-stage wake-up, where the monitoring for the WUS may correspond to a first stage. The first stage of the wake-up may provide for reduced sensitivity to phase noise or receiver nonlinearities, relatively low SNR and/or dynamic range at a digital front end (DFE), reduced bandwidth or search space, and improved topology (e.g., voltage levels and clock frequencies of the hardware). Thus, WUS techniques may reduce power consumption by the UE 115 as compared with scenarios in which the UE 115 remains in an on state.

However, in some cases, the first stage of the WUS may be transmitted via lower layer signaling (e.g., a demodulation reference signal (DMRS) of a PDCCH transmission) that may be unencrypted. As such, the intruder device 225 may hack the first stage of the WUS and transmit a fabricated WUS to one or more UEs 115 (e.g., the intruder signaling 230). The fabricated WUS may instruct a UE 115 to remain awake, which may quickly drain a battery of the UE 115. Additionally, or alternatively, the fabricated WUS may wake up multiple UEs 115 in a network at a time (e.g., each of the UEs 115-*a*, 115-*b*, 115-*c*, and 115-*d*), which may cause congestion in the network, a crash of the network, or other network instabilities.

In accordance with various techniques as discussed herein, to secure lower layer transmissions, a transmitting device, such as the network entity 105-*a* described herein, may apply (e.g., or refrain from removing) a physical layer impairment to a transmission. The physical layer impairment may be known to the transmitting device and an intended receiving device, such as the UE 115-*a*, but not to other devices. For example, the network entity 105-*a* may transmit a physical layer signature configuration 210 or other signaling that indicates the physical layer impairment to the UE 115-*a* via encrypted signaling (e.g., Layer 3 signaling) when the UE 115-*a* is awake. The UE 115-*a* may store the indication of the physical layer impairment (e.g., one or more physical layer signatures for one or more physical layer signals) and use the impairment to determine whether subsequent signals 215 received by the UE 115-*a* are from the network entity 105-*a* or potentially from intruding device 225. If the physical layer signature on a signal 215 received at the UE 115-*a* does not match a valid physical layer signature provided with the physical layer signal configuration 210, the UE 115-*a* may transmit a control message 220 to the network entity 105-*a* that includes one or more estimated parameters 230 of the unmatched physical layer signature. The control message 220 with the estimated parameters 230 may be an RRC message, a MAC-CE, or some other control message 220 (e.g., Layer 2 or Layer 3 signaling). The network entity 105-*a* may receive the estimated parameters 230, and determine if the parameters match a physical layer signature of a different network entity or other authorized device, and provide an indication of whether the detected physical layer signature is valid or invalid. In cases where the detected physical layer signal is invalid, the UE 115-*a* may discard the received physical layer signal, and otherwise may operate in accordance with established procedures related to the signal.

Such lower layer security may add an additional layer of security (e.g., on top of upper layer encryption) to reduce threats of advanced computing techniques. Additionally, or alternatively, the lower layer security may increase link reliability by protecting a control channel, improve security and reliability of lower layer communications, such as wake-up signaling, reduce overhead and latency by reducing a security load associated with upper layer encryption, or any combination thereof. In some cases, the applied impairment may be an AM/AM or AM/PM impairment, which may be applied as a physical layer signature of a transmitting device without consuming power at the cost of some reduction in signal quality (e.g., an SNR penalty). In some cases, the applied impairment may be an I/Q impairment in which the network entity 105-*a* (e.g., a transmitting device) may secure transmissions using a physical layer signature that is based on a frequency domain residual sideband (FDRSB) impairment to provide for increased security for wireless communications. The FDRSB impairment may correspond to an imbalance between an in-phase component (e.g., a real part) and a quadrature phase component (e.g., an imaginary part) of a signal 215. The FDRSB impairment may occur during generation of a signal 215 at the network entity 105-*a* (e.g., a naturally occurring imbalance that is not removed by the network entity 105-*a*, or an artificial FDRSB impairment added to a signal 215 prior to transmission).

The described techniques for physical layer signature-based security may be applied to downlink communications, uplink communications, sidelink communications, or any other type of communication link. For example, in an industrial IoT (IIoT) scenario, a factory node or device may transmit one or more reports to a controller. The factory node may secure the transmissions using the described physical layer signature techniques to reduce the likelihood that an intruding device 225 may generate fraudulent reports that may disturb the factory operations. Thus, one or more devices in the wireless communications system 200 may apply physical layer signature characteristics to signals 215 to secure the information included in the corresponding signals 215. The physical layer signature characteristics may operate as a signature for the transmitting device, such that receiving devices may refrain from responding to or acting on a signal 215 that does not have the expected physical layer signature characteristics.

Figure 3:
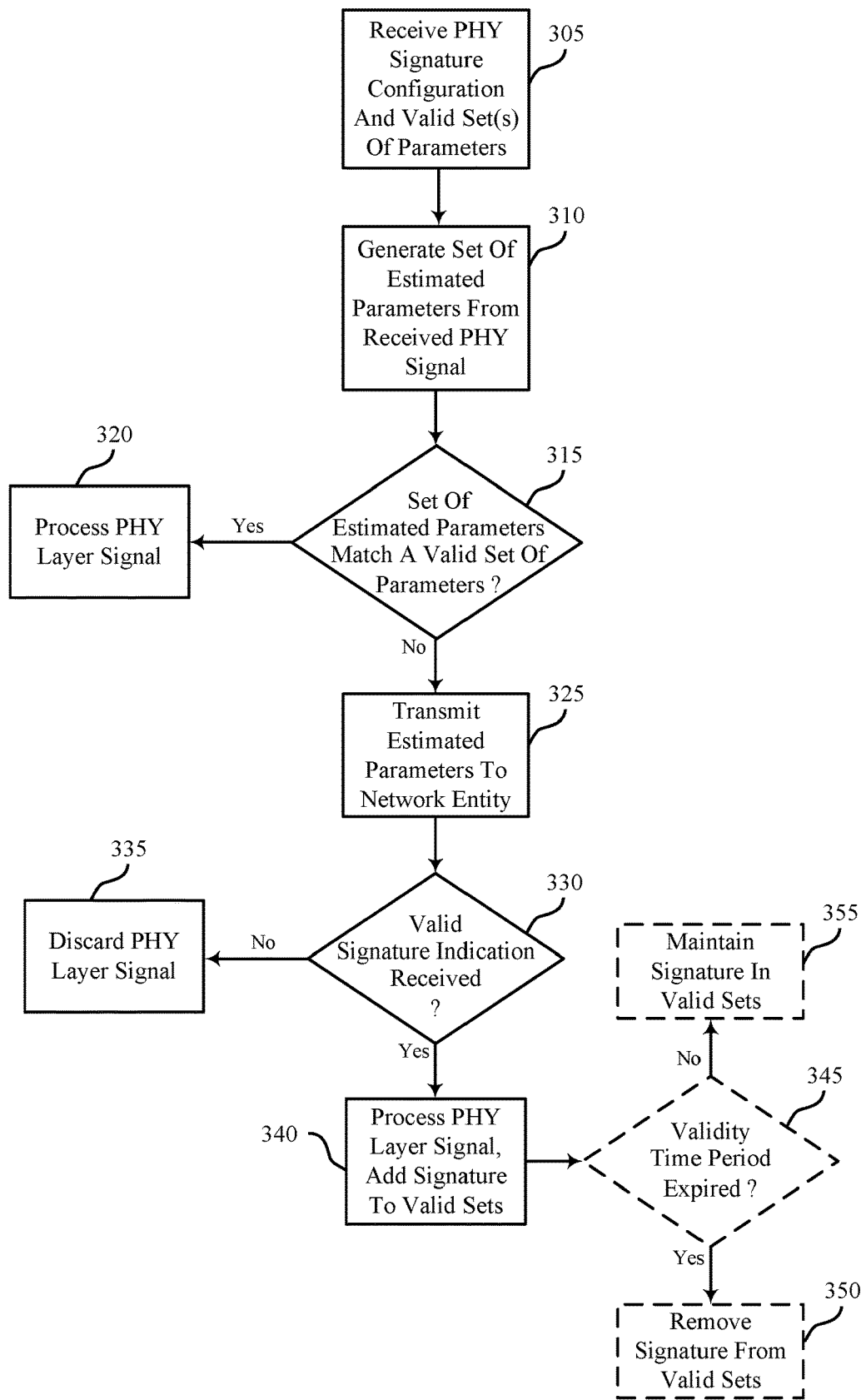
FIG. 3 illustrates an example of a flow chart illustrating a method that supports techniques for configuring physical layer signature feedback in wireless communications in accordance with one or more aspects of the present disclosure.

FIG. 3 illustrates an example of a flow chart illustrating a method 300 that supports techniques for configuring physical layer signature feedback in wireless communications in accordance with one or more aspects of the present disclosure. The method 300 may be implemented by aspects of the wireless communications systems 100 and 200, as described with reference to FIGS. 1-2. For example, the method 300 may illustrate a determination of whether a source of a received signal is a valid network entity or an intruder entity. The method 300 may be implemented by a UE or network entity that may each represent examples of a UE, a base station, a CU, a DU, an RU, an IAB node, or any other network node or device as described with reference to FIGS. 1-2.

In the following description of the method 300, the described operations may be performed in different orders or at different times. Some operations may also be left out of the method 300, or other operations may be added. Although a UE or network entity are discussed as performing the operations of the method 300, some aspects of some operations may also be performed by one or more other wireless devices.

At 305, a UE may receive a physical layer signature configuration and one or more valid sets of physical layer parameters for one or more valid physical layer signatures. In some cases, the physical layer signature configuration may be received from a network entity via downlink signaling, such as a MAC-CE, RRC signaling, or other layer 2 or layer 3 signaling. In some cases, the one or more valid sets of physical layer signatures may include one or more parameters associated with each valid physical layer signature. For example, in cases where the physical layer signature includes an AM/AM or AM/PM impairment, the valid physical layer signature may include an amplitude vector associated with AM/AM and phase vector associated with AM/PM impairment. In cases where the physical layer signature is based on I/Q impairment, such as FDRSB, valid physical layer signatures may include the four vectors of (complex) impulse responses for each of the modules in an FDRSB modeling structure, such as illustrated and discussed with reference to FIG. 4. While AM/AM, AM/PM, and I/Q based physical layer signatures as discussed in various examples herein, other physical layer signatures may be used, and the scope of the present disclosure is not limited to these particular examples.

At 310, the UE may generate a set of estimated parameters from a received physical layer signature. In some cases, the set of estimated parameters may be estimated based on measured AM/AM characteristics, AM/PM characteristics, or I/Q mismatch characteristics of a received physical layer signal (e.g., a PDCCH signal, PDSCH signal, reference signal, synchronization signal, and the like).

At 315, the UE may compare the set of estimated parameters to the one or more valid sets of parameters associated with valid physical layer signatures, and determine whether the estimated parameters correspond to a valid set of parameters. At 320, if the set of estimated parameters corresponds to a valid set of parameters (e.g., the estimated parameters are within a threshold difference value of associated parameters of a valid set of parameters, where the threshold difference may be predefined or configured with the physical layer signature configuration), the UE may process the received physical layer signal in accordance with established physical layer procedures (e.g., decode the corresponding PDCCH, etc.). In some cases, the UE may also transmit an indication to a serving network entity that a valid physical layer signal has been received at the UE.

At 325, if it is determined that the set of estimated parameters does not match a valid set of parameters, the UE may transmit the set of estimated parameters to a network entity (e.g., a serving network entity). In some cases, the set of estimated parameters may be transmitted along with an indication that the estimated parameters to not match a valid set of parameters. Such a transmission may be provided via a MAC-CE, RRC signaling, or some other uplink signaling. In some cases, because the physical layer signature may be time varying, the reported set of estimated parameters may include resource allocation parameters associated with the measured physical layer signal, such as, for example, one or more time-based parameters (e.g., system frame number (SFN), subframe number, slot index, symbol index, or any combinations thereof), one or more frequency-based parameters (e.g., bandwidth part (BWP), resource block (RB) offset within BWP, Number of RBs, or any combinations thereof), one or more spatial parameters (e.g., a receive beam index value), or any combinations thereof.

In some cases, the network entity that receives the set of estimated parameters may check to see if the reported physical layer signature is part of known list of physical layer signatures in the network (e.g., corresponding to a signature of a neighboring network entity). In some cases, if the reported physical layer signature is not part of the known signatures, but does appear to have characteristics that would likely belong to a physical layer signature (e.g., is not some apparent junk or random signature), the network entity may share (e.g., via an Xn interface) the reported "potential" physical layer signature among other network entities and may coordinate regarding the validity of the physical layer signatures with the other network entities. In some cases, while evaluating the reported physical layer signature, the network entity may also consider a location of the reporting UE to assess if the UE can receive the reported signature from the legitimate network entity which uses that signature. Such a consideration may help to prevent an aggressor from attempting to learn or steal a legitimate signature and use it somewhere else, or at least flag such an event that may be investigated.

After a determination related to the validity of the received set of estimated parameters (e.g., based on a response from another network entity or a determination at the network entity), the network entity may signal to the UE whether the set of estimated parameters corresponds to a valid or invalid physical layer signature. At 330, the UE may receive the indication of and determine whether it indicates a valid signature. At 335, if an invalid physical layer signature indication is received, the UE may discard the physical layer signal that is associated with the physical layer signature. At 340, if a valid physical layer signature indication is received, the UE may process the associated physical layer signal, and may add the physical layer signature to the valid sets of parameters at the UE.

In some cases, the network entity may provide a time duration associated with an indication of a valid physical layer signature. At 345, the UE may determine whether a validity time period for the physical layer signature has expired. At 355, if the validity time period has not expired, the UE may maintain the physical layer signature in the valid sets of parameters. Likewise, at 350, if the validity time period has expired, the UE may remove the parameters of the associated physical layer signature from the valid sets of parameters at the UE. Thus, the UE may avoid declaring false "attack" when the associated physical layer signature is received, for a time period (T) of the validity time period provided by the network entity.

Figure 4:
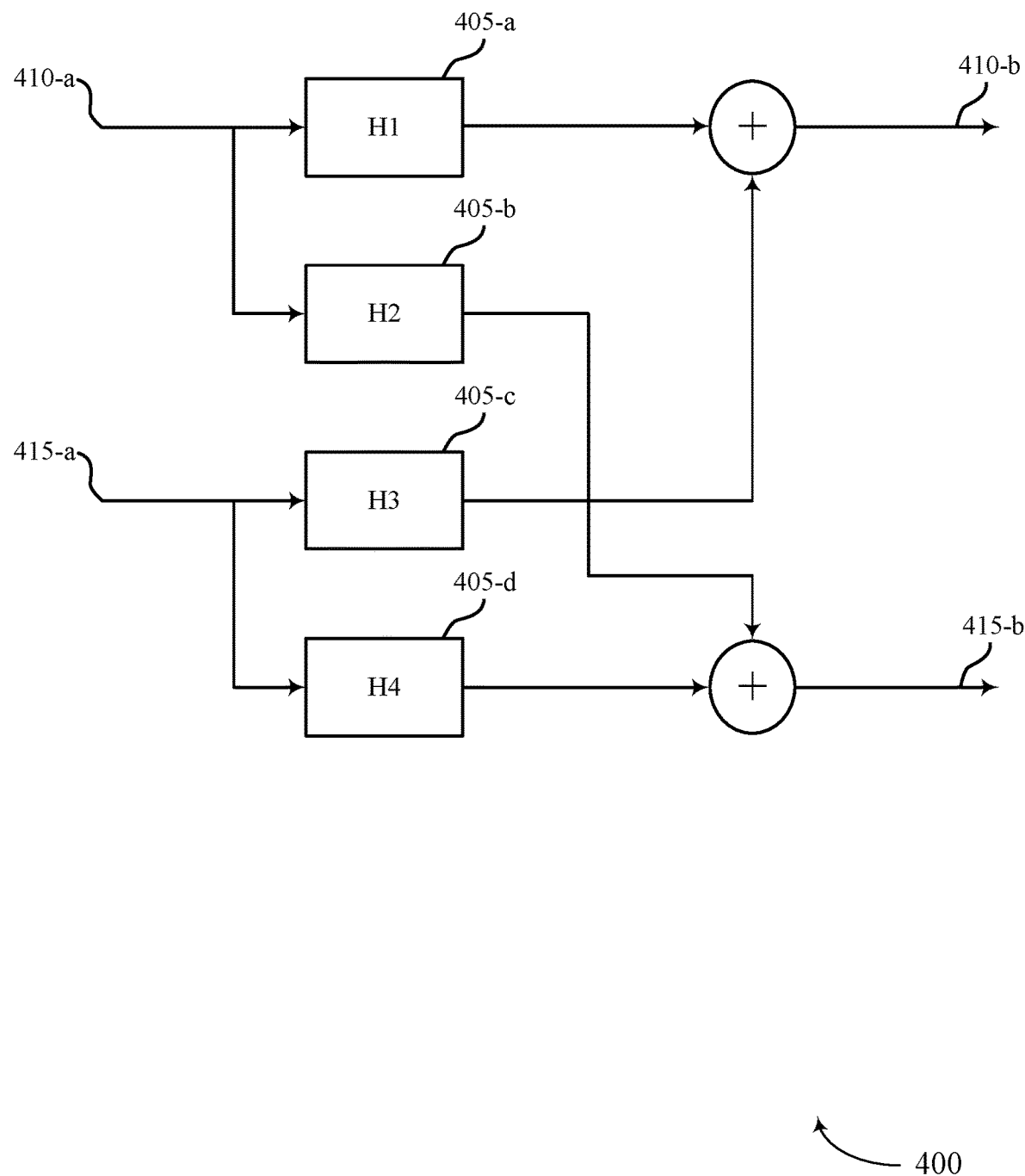
FIG. 4 illustrates an example of a filter diagram that supports techniques for configuring physical layer signature feedback in wireless communications in accordance with one or more aspects of the present disclosure.

FIG. 4 illustrates an example of a filter diagram 400 that supports techniques for configuring physical layer signature feedback in wireless communications in accordance with one or more aspects of the present disclosure. The filter diagram 400 may implement or be implemented by aspects of the wireless communications systems 100 and 200, described with reference to FIGS. 1-2. For example, the filter diagram 400 illustrates example linear filters 405 that may be used to model an FDRSB impairment of a signal. The signal input to the filters 405 may include an in-phase component 410-a and a quadrature phase component 415-a of a received physical layer signal. The filters 405 may be used by a receiving device, a transmitting device, or both to decode and descramble FDRSB characteristics of a signal. The transmitting and receiving devices may each represent examples of a UE, a base station, a network entity, or some other wireless device, as described with reference to FIGS. 1-3.

The in-phase component 410-*a* and the quadrature phase component 415-*a* of the signal may be input to and filtered by one or more respective filters 405 (e.g., filters H1 through H4). Each filter 405 may be a linear time-invariant (LTI) filter, which may preserve a frequency of the signal. The outputs of the filters 405 may be summarized to generate an output signal including an in-phase component 410-*b* and a quadrature phase component 415-*b*. At a transmitting device, the input signal may not include FDRSB characteristics, and the output signal may include the FDRSB characteristics. At a receiving device, the filters 405 may be inverse filters that remove or descramble the FDRSB characteristics from the input signal.

The filters 405 may represent the FDRSB impairment applied to the in-phase component 410-*a*, the quadrature phase component 415-*a*, and cross-talk (e.g., parasitic capacitance) between the components. For example, a transmitting device may pass the in-phase component 410-*a* through the filter 405-*a* (e.g., H1). The cross-talk between an in-phase signal line and a quadrature phase signal line may pass through the filter 405-*c* (e.g., H3) and be summed with the filtered in-phase component 410-*a*. The sum of the outputs of the filters 405-*a* and 405-*c* may represent an output in-phase component 410-*b* having FDRSB characteristics. The quadrature phase component 415-*a* may pass through the filter 405-*d* (e.g., H4). The cross-talk (e.g., parasitic capacitance) between the quadrature phase signal line and the in-phase signal line may pass through the filter 405-*b* (e.g., H2) and be summed with the filtered quadrature phase component 415-*a*. The sum of the outputs of the filters 405-*b* and 405-*d* at a transmitting device may represent an output quadrature phase component 415-*b* having FDRSB characteristics.

The transmitting device may transmit one or more FDRSB parameters to a receiving device for the receiving device to use to decode the FDRSB characteristics. The FDRSB parameters may, in some aspects, include filter parameters for the filters 405-*a*, 405-*b*, 405-*c*, and 405-*d*. The receiving device may utilize the indicated filter parameters to generate an inverse of the filters 405, for example, filters H5, H6, H7, and H8 (not pictured in FIG. 4) that may cancel, reverse, or descramble the FDRSB applied by the filters 405-*a* through 405-*d*. At the receiving device, the input signal including the in-phase component 410-*a* and the quadrature phase component 415-*b* may include one or more FDRSB characteristics. After passing the input signal through the inverse filters 405, the output signal generated by the receiving device may include the in-phase component 410-*b* and the quadrature phase component 415-*b* without FDRSB characteristics. That is, the receiving device may use the inverse filters 405 to decode and descramble the data within a signal from the applied FDRSB characteristics. The signal including the in-phase component 410-*b* and the quadrature phase component 415-*b* may be transmitted over a linear over-the-air (OTA) channel. In some aspects, when applying the inverse of the filters 405 for a linear channel, some noise associated with the channel may be amplified. In such cases, decoding the FDRSB may increase noise (e.g., noise enhancement).

Figure 5:
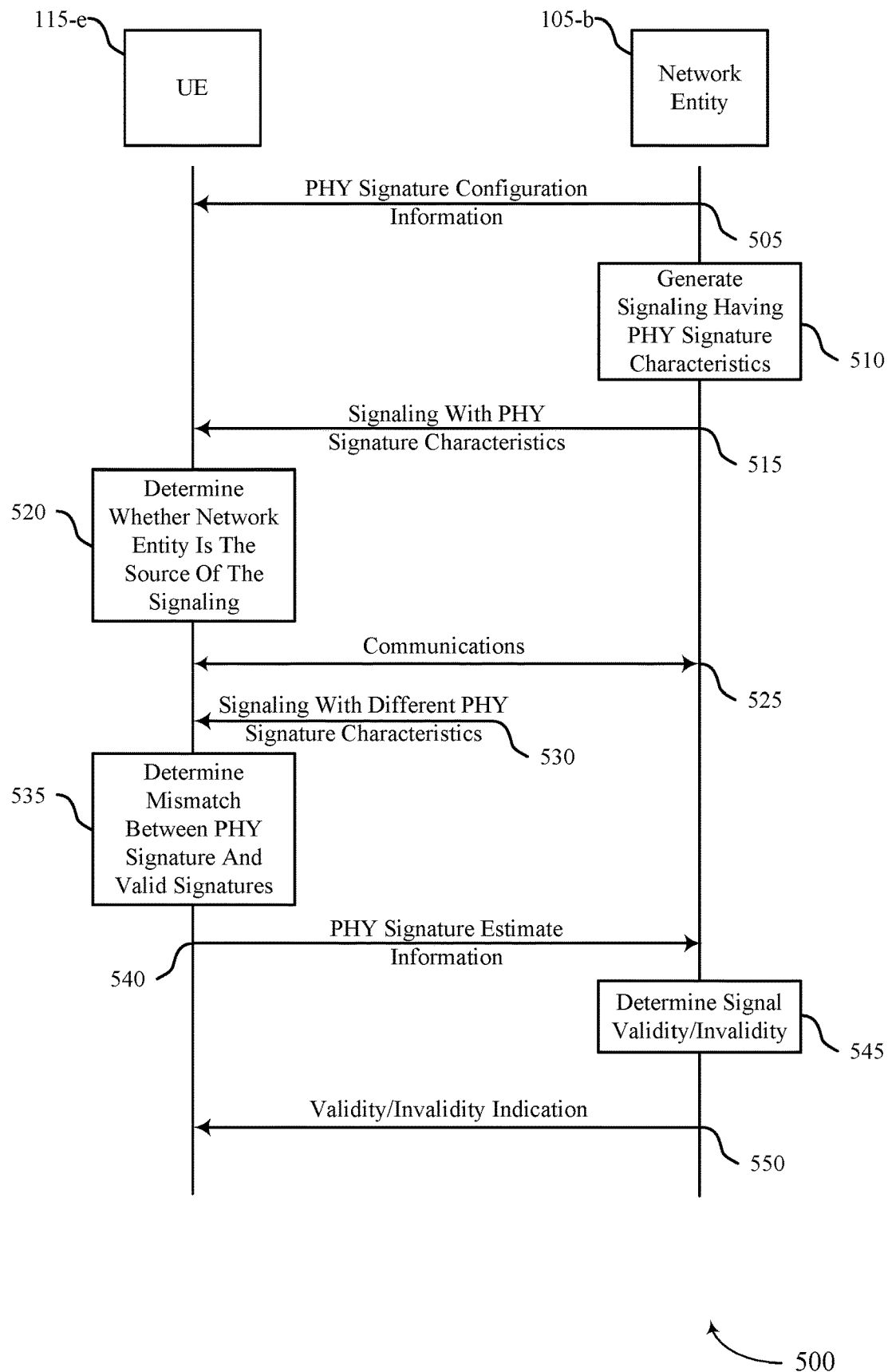
FIG. 5 illustrates an example of a process flow that supports techniques for configuring physical layer signature feedback in wireless communications in accordance with one or more aspects of the present disclosure.

FIG. 5 illustrates an example of a process flow 500 that supports techniques for configuring physical layer signature feedback in wireless communications in accordance with one or more aspects of the present disclosure. The process flow 500 may implement or be implemented by aspects of the wireless communications systems 100 and 200, as described with reference to FIGS. 1-4. For example, the process flow 500 may illustrate a method for determining, by a UE 115-*e*, whether a source of a received signal is a valid network device such as network entity 105-*b* or an intruder device. The UE 115-*e* and the network entity 105-*b* may each represent examples of a UE, a base station, a CU, a DU, an RU, an IAB node, or any other network node or device as described with reference to FIGS. 1-4.

In the following description of the process flow 500, the operations between the UE 115-*e* and the network entity 105-*b* may be performed in different orders or at different times. Some operations may also be left out of the process flow 500, or other operations may be added. Although the UE 115-*e* and the network entity 105-*b* are shown performing the operations of the process flow 500, some aspects of some operations may also be performed by one or more other wireless devices.

At 505, the network entity 105-*b* may transmit, and the UE 115-*e* may receive, physical layer signature configuration information. In some cases, the physical layer signature configuration information may configure verification of physical layer signatures at the UE 115-*e*, and may provide information for determination of the validity or potential invalidity of a received physical layer signal based on its associated physical layer signature. In some cases, the configuration information may provide one or more sets of valid parameters associated with one or more valid physical layer signatures.

At 510, the network entity 105-*b* may generate signaling having physical layer signature characteristics. For example, the network entity 105-*b* may generate a physical layer signal having an AM/AM impairment, an AM/PM impairment, or an I/Q mismatch, that corresponds to one of the valid physical layer signatures indicated in the physical layer configuration information. At 515, the network entity 105-*b* may transmit, and the UE 115-*e* may receive, physical layer signaling with characteristics corresponding to the physical layer signature.

At 520, the UE 115-*e* may determine whether the network entity 105-*b* is the source of the received physical layer signaling. Such a determination may be made in accordance with techniques as discussed herein, through comparison of estimated parameters of a physical layer signature of the received physical layer signal to one or more known sets of valid parameters. In the event that the received physical layer signaling is determined to be valid, the UE 115-*e* and network entity 105-*b*, at 525, may exchange communications in accordance with established communications protocols (e.g., exchange encrypted shared channel communications).

At 530, the UE may receive signaling with different physical layer signature characteristics. For example, a signal may be received from a neighboring network entity, or may be received from an aggressor device. At 535, the UE 115-*e* may determine that there is a mismatch between the physical layer signature associated with this received signaling and the set of valid physical layer signatures at the UE 115-*e*. At 540, the UE 115-*e* may transmit, and the network entity 105-*b* may receive, a report of an unrecognized or invalid physical layer signature, along with a set of estimated physical layer parameters (e.g., measured amplitude vector and/or phase vector of an AM/AM or AM/PM signature, or vectors of (complex) impulse responses for each of the modules in an FDRSB modeling structure for an I/Q mismatch signature).

At 545, the network entity 105-*b* may determine a validity or invalidity associated with the reported physical layer signature (e.g., based on a comparison of known physical layer signatures of neighboring network entities, based on coordination with one or more other network entities, or any combinations thereof). At 550, the network entity 105-*b* may transmit, and the UE 115-*e* may receive, an indication of the validity or invalidity of the reported physical layer signature. In some cases, as discussed herein, the network entity 105-*b*, when providing an indication of a valid signal, may provide a time period during which the signature is to be considered to be valid. In some cases, in the event of a determination of an invalid signature, the network entity 105-*b* may provide a report of a potential aggressor to one or more other network entities, and an investigation of the potential aggressor may be initiated.

Figure 6:
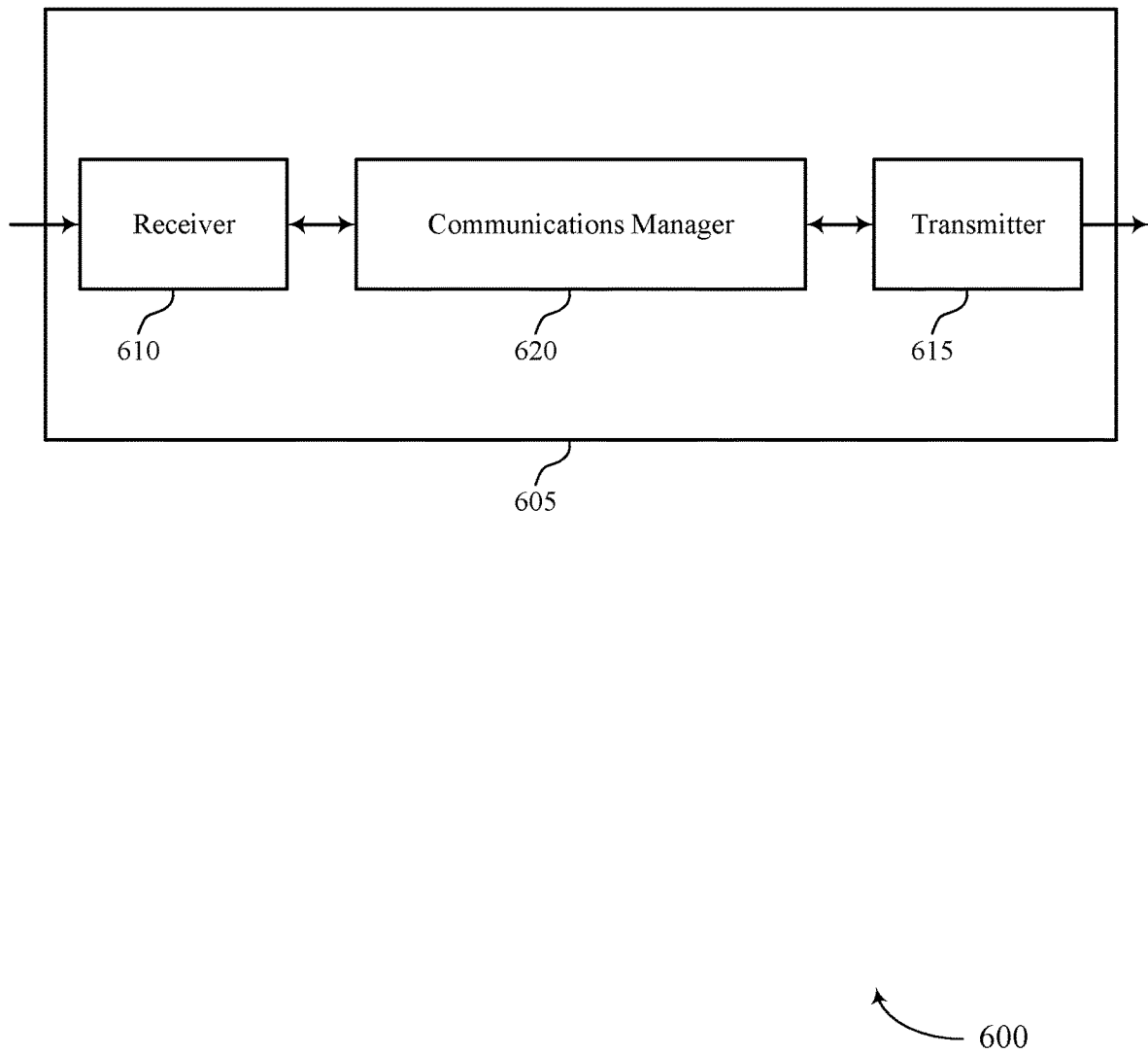
FIGS. 6 and 7 show block diagrams of devices that support techniques for configuring physical layer signature feedback in wireless communications in accordance with one or more aspects of the present disclosure.

FIG. 6 shows a block diagram 600 of a device 605 that supports techniques for configuring physical layer signature feedback in wireless communications in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for configuring physical layer signature feedback in wireless communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for configuring physical layer signature feedback in wireless communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for configuring physical layer signature feedback in wireless communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving configuration information for at least one physical layer signal that is modified by a physical layer signature, the physical layer signature is associated with a set of parameters that are applied to the physical layer signal. The communications manager 620 may be configured as or otherwise support a means for generating a set of estimated parameters of a received physical layer signature of a received physical layer signal. The communications manager 620 may be configured as or otherwise support a means for identifying a mismatch between the set of estimated parameters of the received physical layer signature and the set of parameters provided in the configuration information. The communications manager 620 may be configured as or otherwise support a means for transmitting, based on the identified mismatch, the set of estimated parameters of the received physical layer signature to a network entity.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for detection of potential aggressor devices that may seek to disrupt network access or performance in a wireless communications system. Such detection may enhance network reliability and security, reduce latency, and may be provided with relatively low power overhead.

Figure 7:
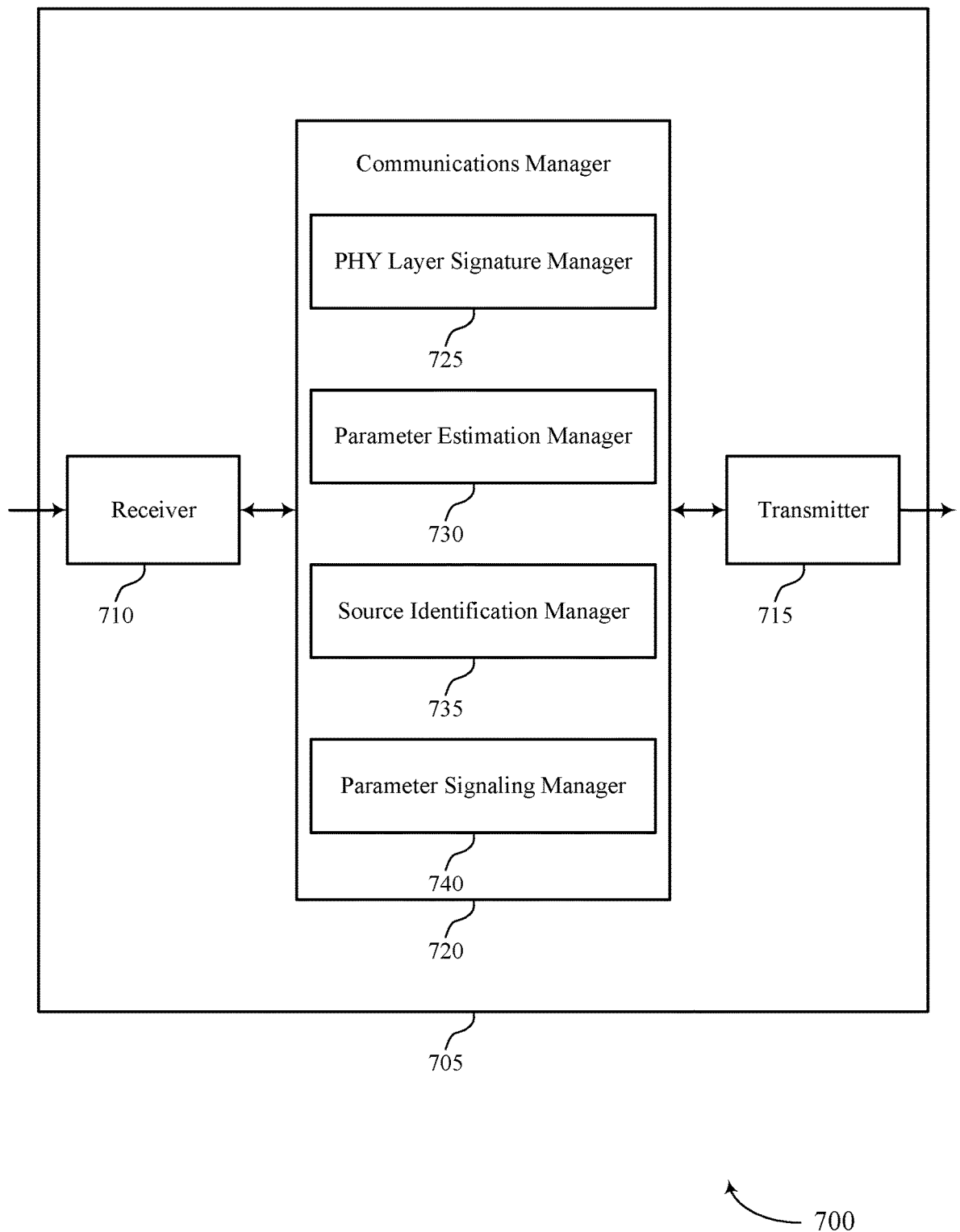

FIG. 7 shows a block diagram 700 of a device 705 that supports techniques for configuring physical layer signature feedback in wireless communications in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for configuring physical layer signature feedback in wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for configuring physical layer signature feedback in wireless communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for configuring physical layer signature feedback in wireless communications as described herein. For example, the communications manager 720 may include an PHY layer signature manager 725, a parameter estimation manager 730, a source identification manager 735, a parameter signaling manager 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The PHY layer signature manager 725 may be configured as or otherwise support a means for receiving configuration information for at least one physical layer signal that is modified by a physical layer signature, the physical layer signature is associated with a set of parameters that are applied to the physical layer signal. The parameter estimation manager 730 may be configured as or otherwise support a means for generating a set of estimated parameters of a received physical layer signature of a received physical layer signal. The source identification manager 735 may be configured as or otherwise support a means for identifying a mismatch between the set of estimated parameters of the received physical layer signature and the set of parameters provided in the configuration information. The parameter signaling manager 740 may be configured as or otherwise support a means for transmitting, based on the identified mismatch, the set of estimated parameters of the received physical layer signature to a network entity.

Figure 8:
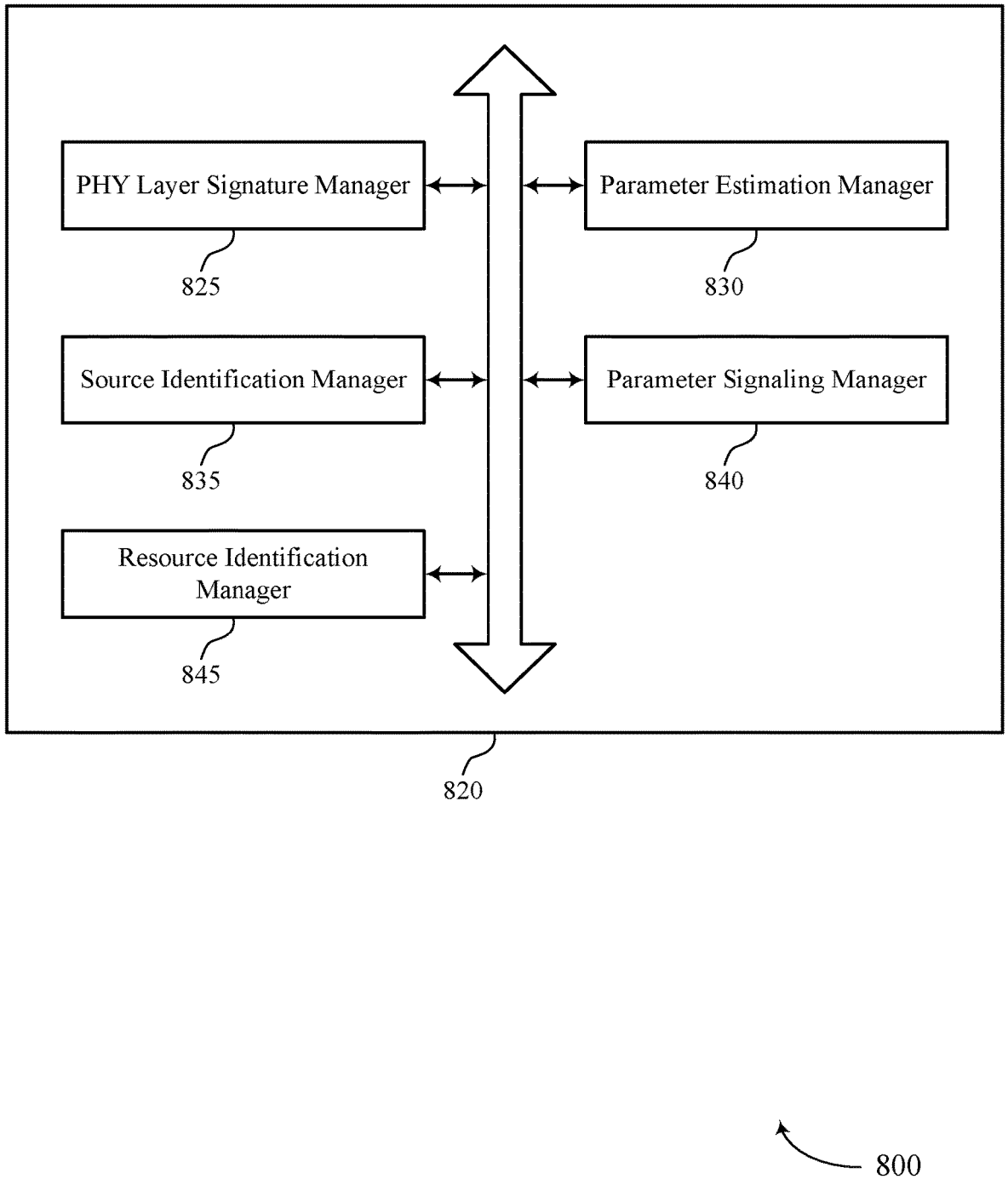
FIG. 8 shows a block diagram of a communications manager that supports techniques for configuring physical layer signature feedback in wireless communications in accordance with one or more aspects of the present disclosure.

FIG. 8 shows a block diagram 800 of a communications manager 820 that supports techniques for configuring physical layer signature feedback in wireless communications in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for configuring physical layer signature feedback in wireless communications as described herein. For example, the communications manager 820 may include an PHY layer signature manager 825, a parameter estimation manager 830, a source identification manager 835, a parameter signaling manager 840, a resource identification manager 845, or any combination thereof. Each of these components may communicate, directly or indirectly, with one another (e.g., via one or more buses).

The communications manager 820 may support wireless communication at a UE in accordance with examples as disclosed herein. The PHY layer signature manager 825 may be configured as or otherwise support a means for receiving configuration information for at least one physical layer signal that is modified by a physical layer signature, the physical layer signature is associated with a set of parameters that are applied to the physical layer signal. The parameter estimation manager 830 may be configured as or otherwise support a means for generating a set of estimated parameters of a received physical layer signature of a received physical layer signal. The source identification manager 835 may be configured as or otherwise support a means for identifying a mismatch between the set of estimated parameters of the received physical layer signature and the set of parameters provided in the configuration information. The parameter signaling manager 840 may be configured as or otherwise support a means for transmitting, based on the identified mismatch, the set of estimated parameters of the received physical layer signature to a network entity.

In some examples, the source identification manager 835 may be configured as or otherwise support a means for comparing the set of estimated parameters of the received physical layer signature to a set of multiple valid sets of physical layer signature parameters, and where the set of estimated parameters is transmitted to the network entity based on the set of estimated parameters being absent from the set of multiple valid sets of physical layer parameters.

In some examples, to support transmitting the set of estimated parameters of the received physical layer signature, the parameter signaling manager 840 may be configured as or otherwise support a means for transmitting a medium access control (MAC) control element, or RRC signaling, that indicates the set of estimated parameters of the received physical layer signature. In some examples, the set of estimated parameters of the received physical layer signature include one or more amplitude parameters, one or more phase parameters, one or more frequency parameters, or any combinations thereof. In some examples, the set of estimated parameters include one or more of an amplitude vector of an AM/AM physical layer signature applied to the received physical layer signal, a phase vector of an AM/PM physical layer signature applied to the received physical layer signal, a set of vectors of impulse responses of a FDRSB estimation of the received physical layer signal, or any combinations thereof.

In some examples, the set of estimated parameters include an indication of a resource allocation associated with the received physical layer signal. In some examples, the indication of the resource allocation associated with the received physical layer signal includes one or more of a system frame number, a subframe number, a slot index, a symbol index, a BWP, an RB offset within the BWP, a number of RBs, a receive beam index, or any combinations thereof. In some examples, the set of estimated parameters are provided for verification at the network entity of a validity of the received physical layer signal.

In some examples, the PHY layer signature manager 825 may be configured as or otherwise support a means for receiving, from the network entity, an indication that the received physical layer signature is a valid signature or an invalid signature. In some examples, the PHY layer signature manager 825 may be configured as or otherwise support a means for receiving, from the network entity, an indication of a time period associated with the indication that the received physical layer signature is a valid signature, where the received physical layer signature is considered invalid after an expiration of the time period. In some examples, the PHY layer signature manager 825 may be configured as or otherwise support a means for adding the received physical layer signature to a list of valid physical layer signatures at the UE.

Figure 9:
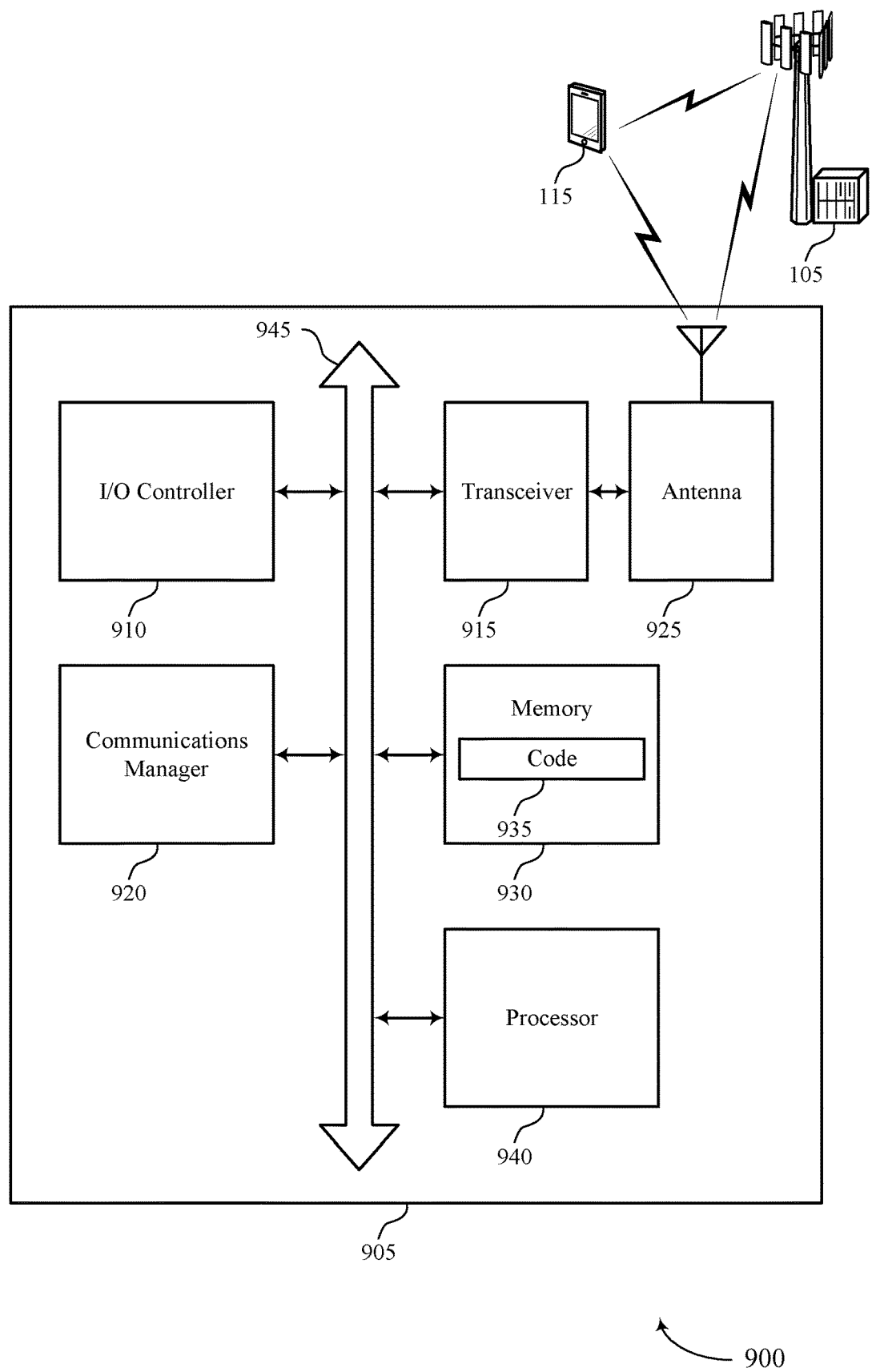
FIG. 9 shows a diagram of a system including a device that supports techniques for configuring physical layer signature feedback in wireless communications in accordance with one or more aspects of the present disclosure.

FIG. 9 shows a diagram of a system 900 including a device 905 that supports techniques for configuring physical layer signature feedback in wireless communications in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for configuring physical layer signature feedback in wireless communications). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving configuration information for at least one physical layer signal that is modified by a physical layer signature, the physical layer signature is associated with a set of parameters that are applied to the physical layer signal. The communications manager 920 may be configured as or otherwise support a means for generating a set of estimated parameters of a received physical layer signature of a received physical layer signal. The communications manager 920 may be configured as or otherwise support a means for identifying a mismatch between the set of estimated parameters of the received physical layer signature and the set of parameters provided in the configuration information. The communications manager 920 may be configured as or otherwise support a means for transmitting, based on the identified mismatch, the set of estimated parameters of the received physical layer signature to a network entity.

By including or configuring the communications manager 920 in accordance with examples as described herein, the device 905 may support techniques for detection of potential aggressor devices that may seek to disrupt network access or performance in a wireless communications system. Such detection may enhance network reliability and security, reduce latency, and may be provided with relatively low power overhead.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for configuring physical layer signature feedback in wireless communications as described herein, or the processor 940 and the memory 930 may be otherwise configured to perform or support such operations.

Figure 10:
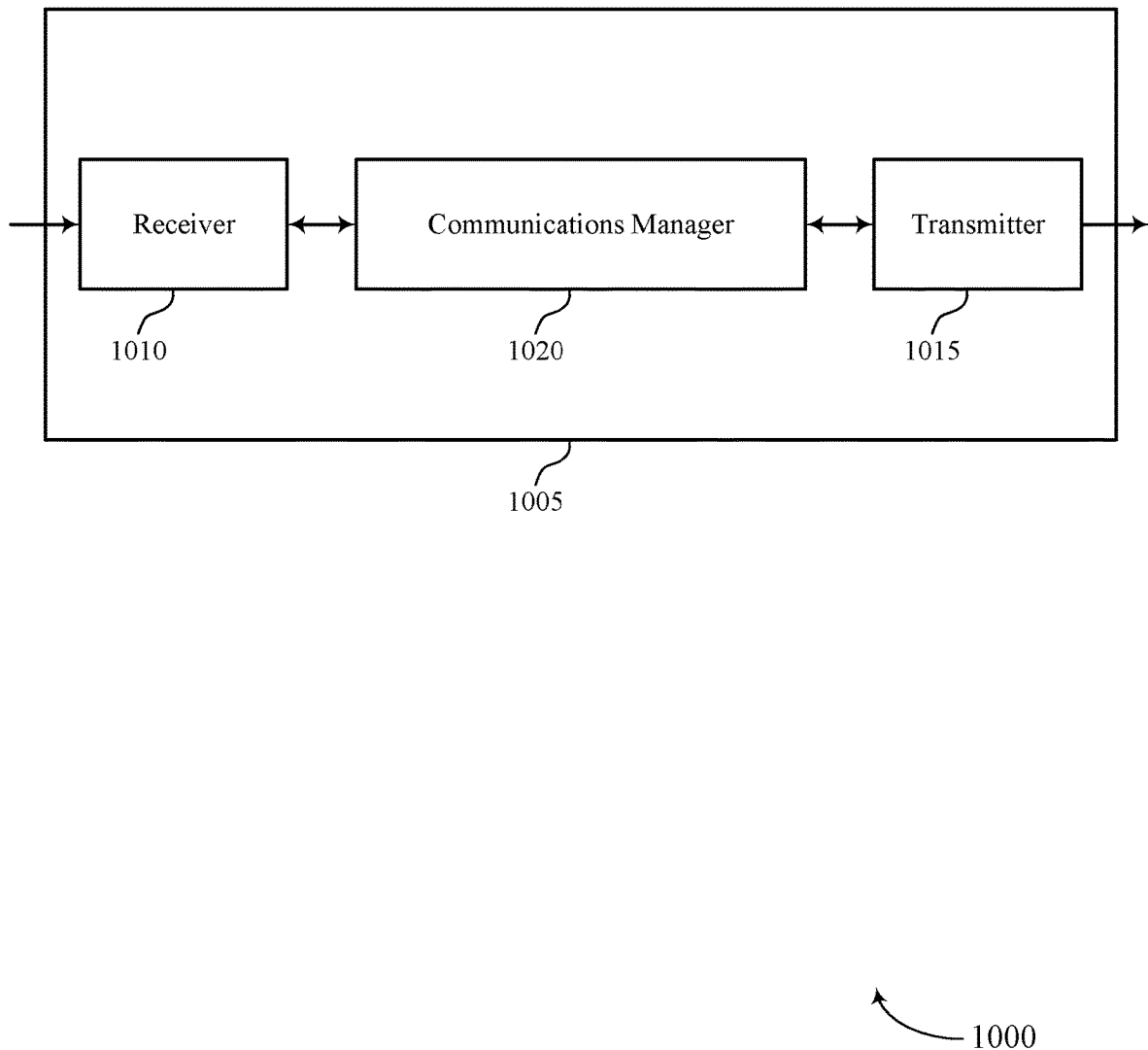
FIGS. 10 and 11 show block diagrams of devices that support techniques for configuring physical layer signature feedback in wireless communications in accordance with one or more aspects of the present disclosure.

FIG. 10 shows a block diagram 1000 of a device 1005 that supports techniques for configuring physical layer signature feedback in wireless communications in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for configuring physical layer signature feedback in wireless communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for transmitting configuration information to a UE for at least one physical layer signal that is modified by a physical layer signature, the physical layer signature associated with a set of parameters that are applied to the physical layer signal. The communications manager 1020 may be configured as or otherwise support a means for receiving, from the UE, a set of estimated parameters of a received physical layer signature received at the UE. The communications manager 1020 may be configured as or otherwise support a means for transmitting, to the UE, an indication that the set of estimated parameters is associated with a valid physical layer signature or an invalid physical layer signature based on whether the set of estimated parameters corresponds to a neighboring physical layer signature of one or more neighboring network entities.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for detection of potential aggressor devices that may seek to disrupt network access or performance in a wireless communications system. Such detection may enhance network reliability and security, reduce latency, and may be provided with relatively low power overhead.

Figure 11:
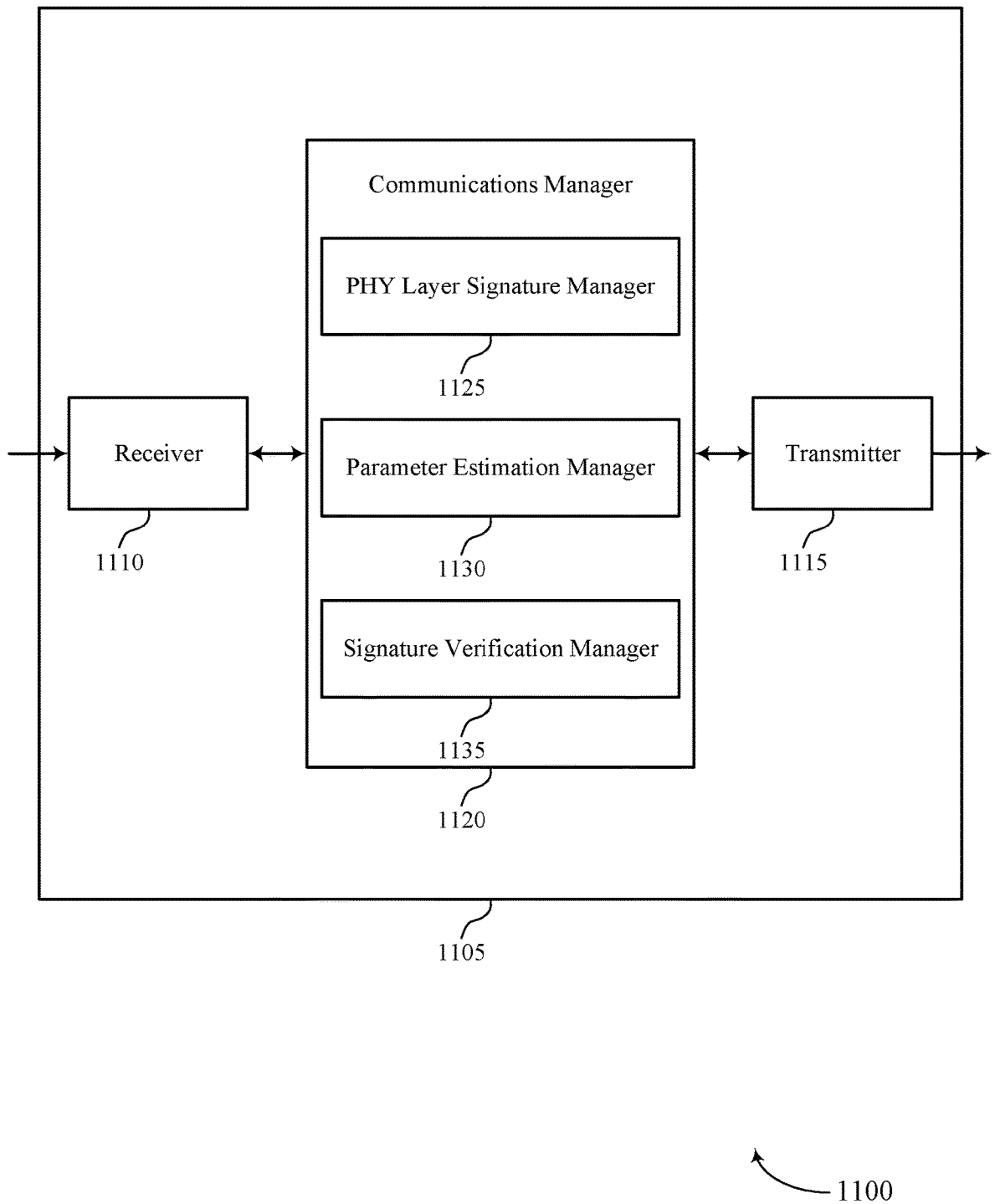

FIG. 11 shows a block diagram 1100 of a device 1105 that supports techniques for configuring physical layer signature feedback in wireless communications in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for configuring physical layer signature feedback in wireless communications as described herein. For example, the communications manager 1120 may include an PHY layer signature manager 1125, a parameter estimation manager 1130, a signature verification manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The PHY layer signature manager 1125 may be configured as or otherwise support a means for transmitting configuration information to a UE for at least one physical layer signal that is modified by a physical layer signature, the physical layer signature associated with a set of parameters that are applied to the physical layer signal. The parameter estimation manager 1130 may be configured as or otherwise support a means for receiving, from the UE, a set of estimated parameters of a received physical layer signature received at the UE. The signature verification manager 1135 may be configured as or otherwise support a means for transmitting, to the UE, an indication that the set of estimated parameters is associated with a valid physical layer signature or an invalid physical layer signature based on whether the set of estimated parameters corresponds to a neighboring physical layer signature of one or more neighboring network entities.

Figure 12:
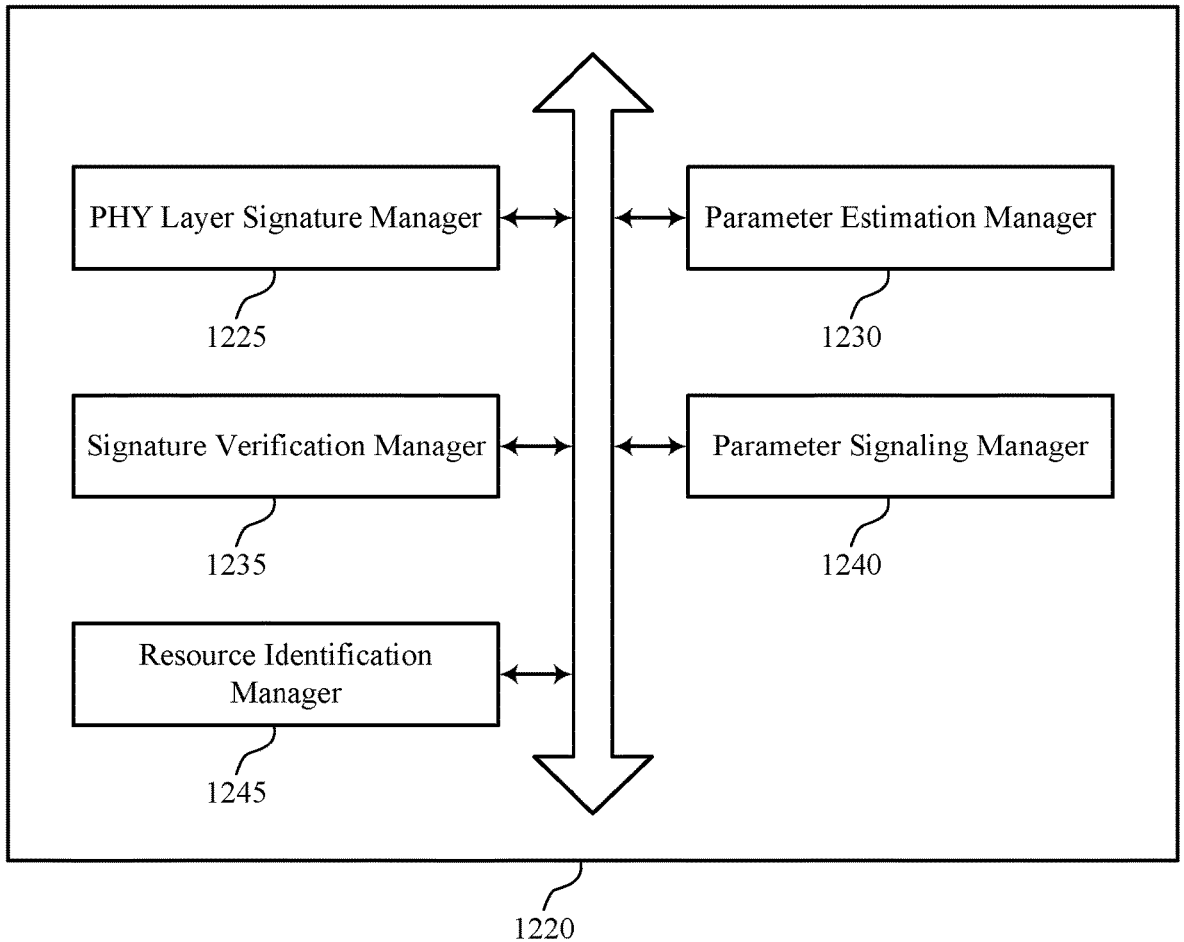
FIG. 12 shows a block diagram of a communications manager that supports techniques for configuring physical layer signature feedback in wireless communications in accordance with one or more aspects of the present disclosure.

FIG. 12 shows a block diagram 1200 of a communications manager 1220 that supports techniques for configuring physical layer signature feedback in wireless communications in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for configuring physical layer signature feedback in wireless communications as described herein. For example, the communications manager 1220 may include an PHY layer signature manager 1225, a parameter estimation manager 1230, a signature verification manager 1235, a parameter signaling manager 1240, a resource identification manager 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The PHY layer signature manager 1225 may be configured as or otherwise support a means for transmitting configuration information to a UE for at least one physical layer signal that is modified by a physical layer signature, the physical layer signature associated with a set of parameters that are applied to the physical layer signal. The parameter estimation manager 1230 may be configured as or otherwise support a means for receiving, from the UE, a set of estimated parameters of a received physical layer signature received at the UE. The signature verification manager 1235 may be configured as or otherwise support a means for transmitting, to the UE, an indication that the set of estimated parameters is associated with a valid physical layer signature or an invalid physical layer signature based on whether the set of estimated parameters corresponds to a neighboring physical layer signature of one or more neighboring network entities.

In some examples, the signature verification manager 1235 may be configured as or otherwise support a means for comparing the set of estimated parameters to a set of multiple valid sets of physical layer signature parameters, and where the indication that the set of estimated parameters is associated with an invalid physical layer signature is based on the estimated parameters being absent from the set of multiple valid sets of physical layer parameters.

In some examples, to support receiving set of estimated parameters, the parameter signaling manager 1240 may be configured as or otherwise support a means for receiving a medium access control (MAC) control element, or RRC signaling, that indicates the set of estimated parameters. In some examples, the set of estimated parameters of the received physical layer signature include one or more of an amplitude vector of an AM/AM physical layer signature applied to the received physical layer signal, a phase vector of an AM/PM physical layer signature applied to the received physical layer signal, a set of vectors of impulse responses of a FDRSB estimation of the received physical layer signal, or any combinations thereof.

In some examples, the estimated physical layer signature parameters include an indication of a resource allocation associated with the received physical layer signature received at the UE. In some examples, the indication of the resource allocation associated with the received physical layer signature received at the UE includes one or more of a system frame number, a subframe number, a slot index, a symbol index, a BWP, an RB offset within the BWP, a number of RBs, a receive beam index, or any combinations thereof. In some examples, the signature verification manager 1235 may be configured as or otherwise support a means for transmitting an indication of a time period associated with the indication that the set of estimated parameters is associated with a valid physical layer signature, where the received physical layer signature is considered invalid after an expiration of the time period.

Figure 13:
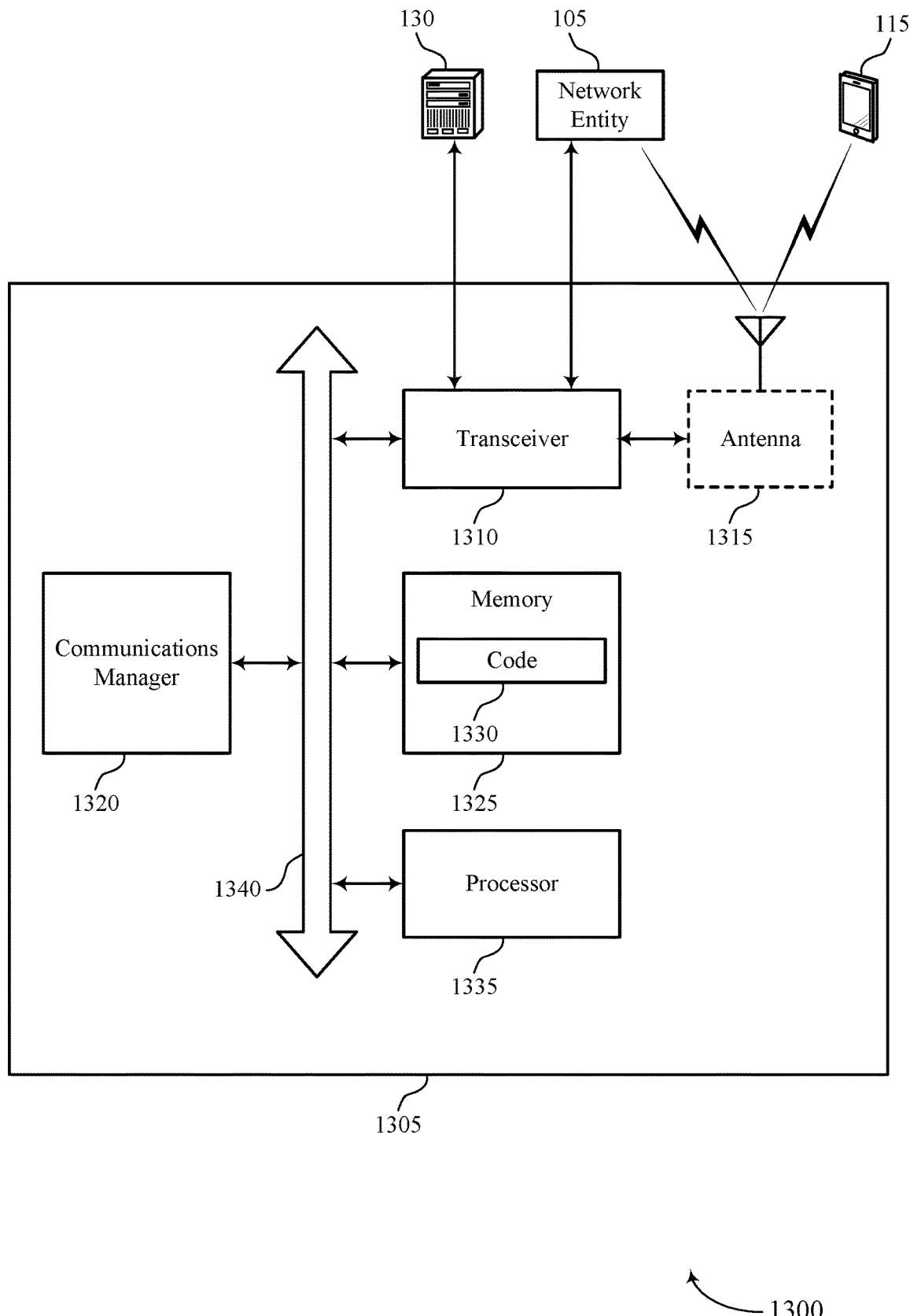
FIG. 13 shows a diagram of a system including a device that supports techniques for configuring physical layer signature feedback in wireless communications in accordance with one or more aspects of the present disclosure.

FIG. 13 shows a diagram of a system 1300 including a device 1305 that supports techniques for configuring physical layer signature feedback in wireless communications in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for configuring physical layer signature feedback in wireless communications). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for transmitting configuration information to a UE for at least one physical layer signal that is modified by a physical layer signature, the physical layer signature associated with a set of parameters that are applied to the physical layer signal. The communications manager 1320 may be configured as or otherwise support a means for receiving, from the UE, a set of estimated parameters of a received physical layer signature received at the UE. The communications manager 1320 may be configured as or otherwise support a means for transmitting, to the UE, an indication that the set of estimated parameters is associated with a valid physical layer signature or an invalid physical layer signature based on whether the set of estimated parameters corresponds to a neighboring physical layer signature of one or more neighboring network entities.

By including or configuring the communications manager 1320 in accordance with examples as described herein, the device 1305 may support techniques for detection of potential aggressor devices that may seek to disrupt network access or performance in a wireless communications system. Such detection may enhance network reliability and security, reduce latency, and may be provided with relatively low power overhead.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of techniques for configuring physical layer signature feedback in wireless communications as described herein, or the processor 1335 and the memory 1325 may be otherwise configured to perform or support such operations.

Figure 14:
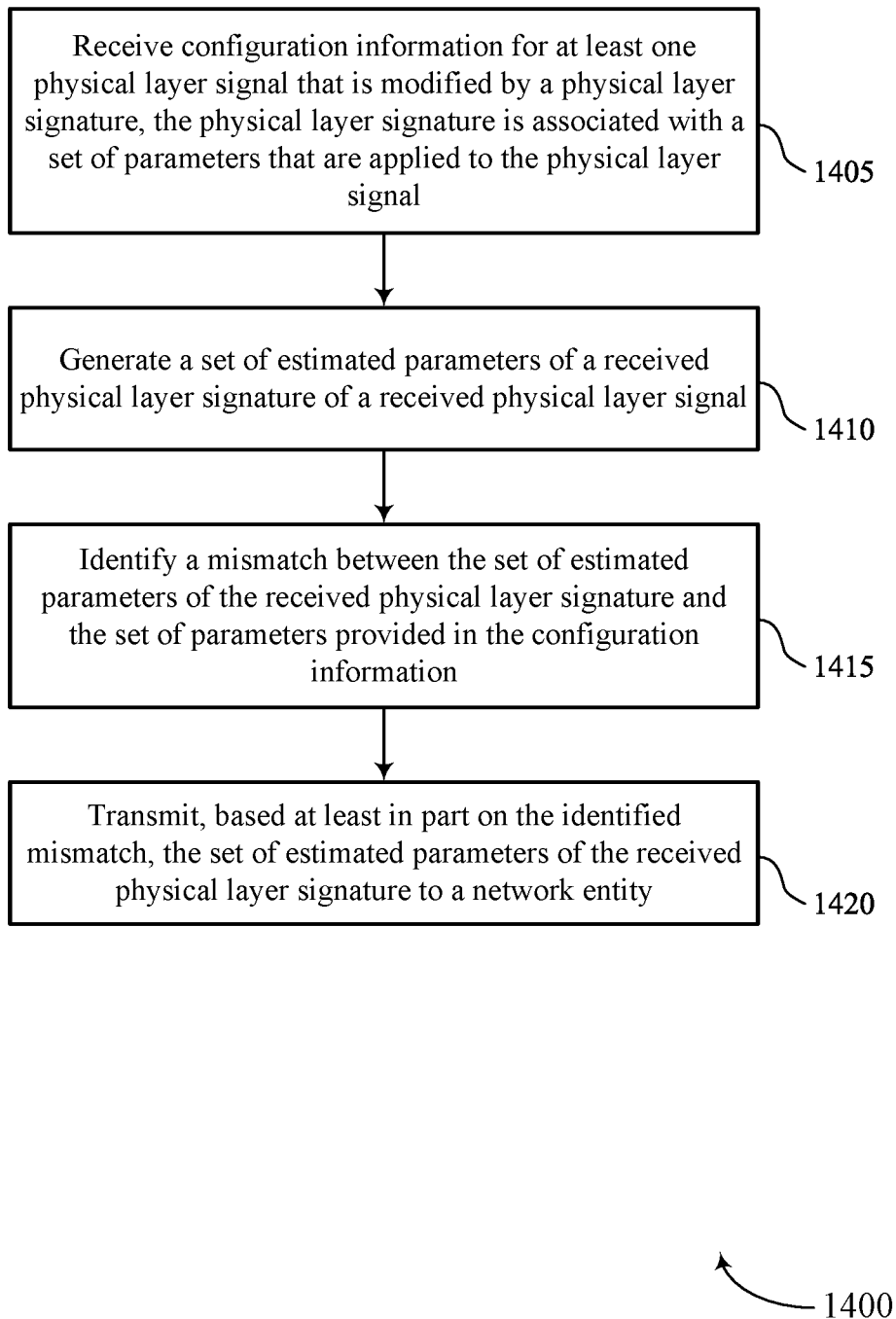
FIGS. 14 through 19 show flowcharts illustrating methods that support techniques for configuring physical layer signature feedback in wireless communications in accordance with one or more aspects of the present disclosure.

FIG. 14 shows a flowchart illustrating a method 1400 that supports techniques for configuring physical layer signature feedback in wireless communications in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving configuration information for at least one physical layer signal that is modified by a physical layer signature, the physical layer signature is associated with a set of parameters that are applied to the physical layer signal. The operations of 1405 may be performed in accordance with examples as disclosed herein. In some examples, aspects of the operations of 1405 may be performed by an PHY layer signature manager 825 as described with reference to FIG. 8.

At 1410, the method may include generating a set of estimated parameters of a received physical layer signature of a received physical layer signal. The operations of 1410 may be performed in accordance with examples as disclosed herein. In some examples, aspects of the operations of 1410 may be performed by a parameter estimation manager 830 as described with reference to FIG. 8.

At 1415, the method may include identifying a mismatch between the set of estimated parameters of the received physical layer signature and the set of parameters provided in the configuration information. The operations of 1415 may be performed in accordance with examples as disclosed herein. In some examples, aspects of the operations of 1415 may be performed by a source identification manager 835 as described with reference to FIG. 8.

At 1420, the method may include transmitting, based on the identified mismatch, the set of estimated parameters of the received physical layer signature to a network entity. The operations of 1420 may be performed in accordance with examples as disclosed herein. In some examples, aspects of the operations of 1420 may be performed by a parameter signaling manager 840 as described with reference to FIG. 8.

Figure 15:
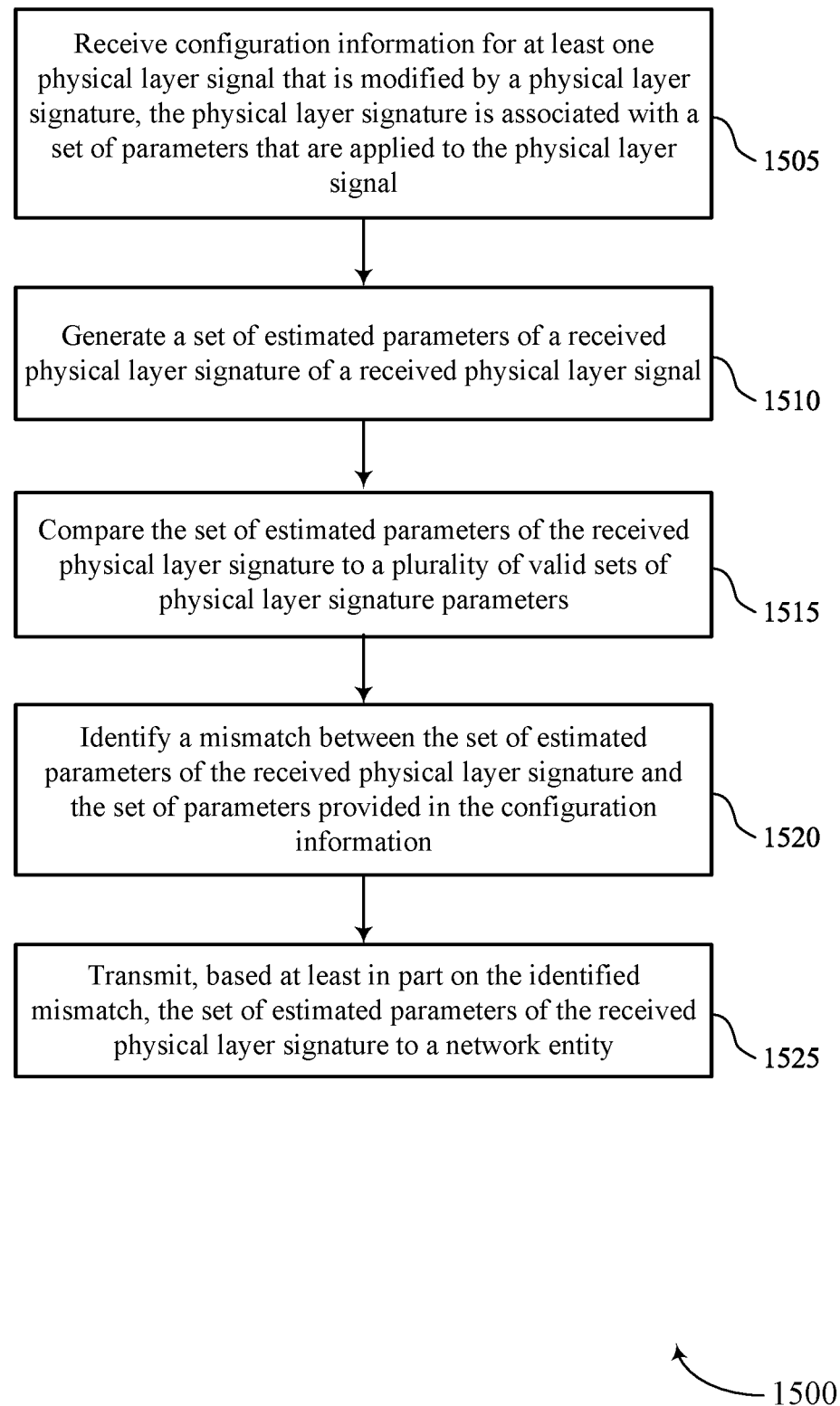

FIG. 15 shows a flowchart illustrating a method 1500 that supports techniques for configuring physical layer signature feedback in wireless communications in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving configuration information for at least one physical layer signal that is modified by a physical layer signature, the physical layer signature is associated with a set of parameters that are applied to the physical layer signal. The operations of 1505 may be performed in accordance with examples as disclosed herein. In some examples, aspects of the operations of 1505 may be performed by an PHY layer signature manager 825 as described with reference to FIG. 8.

At 1510, the method may include generating a set of estimated parameters of a received physical layer signature of a received physical layer signal. The operations of 1510 may be performed in accordance with examples as disclosed herein. In some examples, aspects of the operations of 1510 may be performed by a parameter estimation manager 830 as described with reference to FIG. 8.

At 1515, the method may include comparing the set of estimated parameters of the received physical layer signature to a set of multiple valid sets of physical layer signature parameters. The operations of 1515 may be performed in accordance with examples as disclosed herein. In some examples, aspects of the operations of 1515 may be performed by a source identification manager 835 as described with reference to FIG. 8.

At 1520, the method may include identifying a mismatch between the set of estimated parameters of the received physical layer signature and the set of parameters provided in the configuration information. The operations of 1520 may be performed in accordance with examples as disclosed herein. In some examples, aspects of the operations of 1520 may be performed by a source identification manager 835 as described with reference to FIG. 8.

At 1525, the method may include transmitting, based on the identified mismatch, the set of estimated parameters of the received physical layer signature to a network entity. The operations of 1525 may be performed in accordance with examples as disclosed herein. In some examples, aspects of the operations of 1525 may be performed by a parameter signaling manager 840 as described with reference to FIG. 8.

Figure 16:
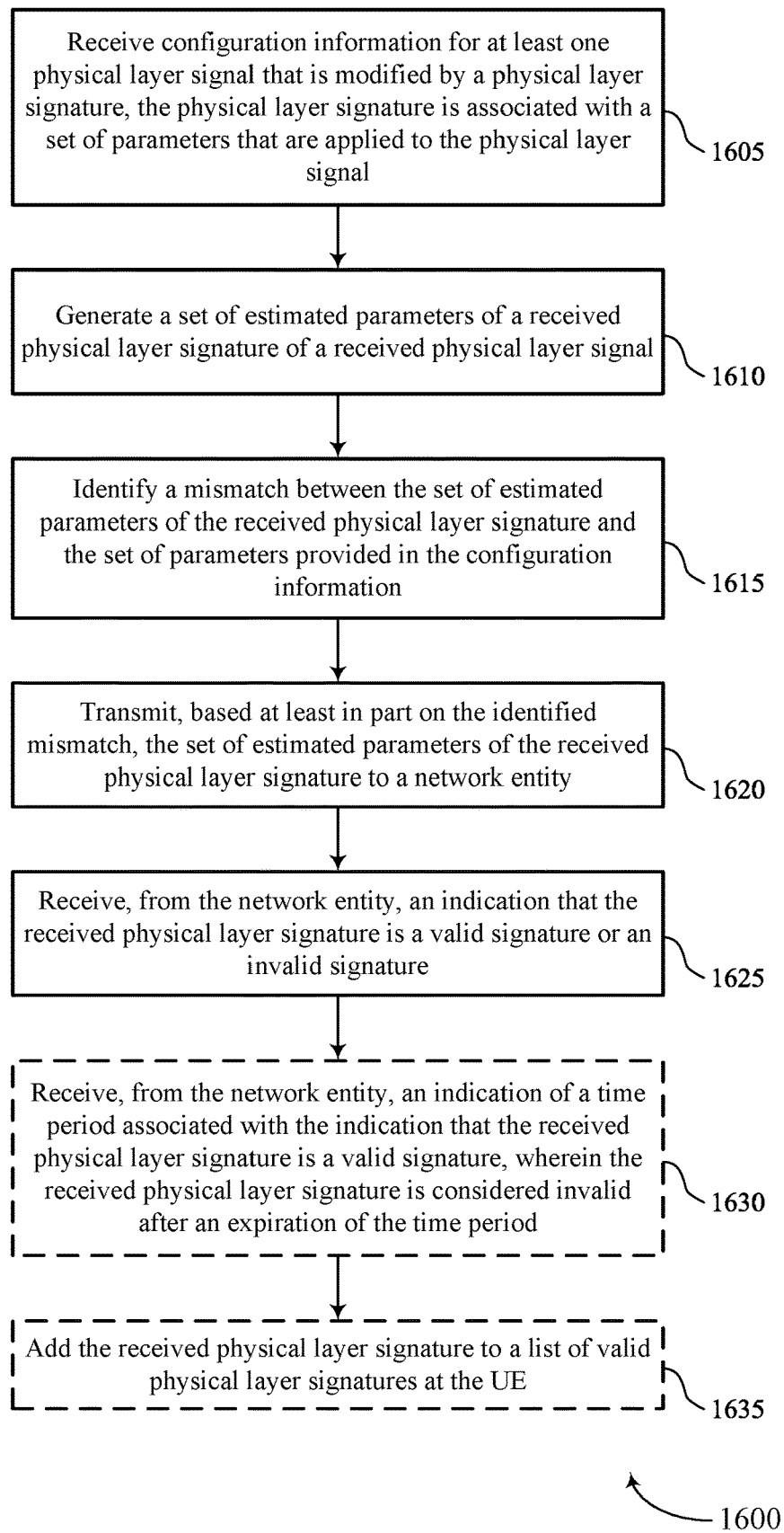

FIG. 16 shows a flowchart illustrating a method 1600 that supports techniques for configuring physical layer signature feedback in wireless communications in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving configuration information for at least one physical layer signal that is modified by a physical layer signature, the physical layer signature is associated with a set of parameters that are applied to the physical layer signal. The operations of 1605 may be performed in accordance with examples as disclosed herein. In some examples, aspects of the operations of 1605 may be performed by an PHY layer signature manager 825 as described with reference to FIG. 8.

At 1610, the method may include generating a set of estimated parameters of a received physical layer signature of a received physical layer signal. The operations of 1610 may be performed in accordance with examples as disclosed herein. In some examples, aspects of the operations of 1610 may be performed by a parameter estimation manager 830 as described with reference to FIG. 8.

At 1615, the method may include identifying a mismatch between the set of estimated parameters of the received physical layer signature and the set of parameters provided in the configuration information. The operations of 1615 may be performed in accordance with examples as disclosed herein. In some examples, aspects of the operations of 1615 may be performed by a source identification manager 835 as described with reference to FIG. 8.

At 1620, the method may include transmitting, based on the identified mismatch, the set of estimated parameters of the received physical layer signature to a network entity. The operations of 1620 may be performed in accordance with examples as disclosed herein. In some examples, aspects of the operations of 1620 may be performed by a parameter signaling manager 840 as described with reference to FIG. 8.

At 1625, the method may include receiving, from the network entity, an indication that the received physical layer signature is a valid signature or an invalid signature. The operations of 1625 may be performed in accordance with examples as disclosed herein. In some examples, aspects of the operations of 1625 may be performed by an PHY layer signature manager 825 as described with reference to FIG. 8.

At 1630, in the event of a valid signature indication, the method may include receiving, from the network entity, an indication of a time period associated with the indication that the received physical layer signature is a valid signature, where the received physical layer signature is considered invalid after an expiration of the time period. The operations of 1630 may be performed in accordance with examples as disclosed herein. In some examples, aspects of the operations of 1630 may be performed by an PHY layer signature manager 825 as described with reference to FIG. 8.

At 1635, in the event of a valid signature indication, the method may include adding the received physical layer signature to a list of valid physical layer signatures at the UE. The operations of 1635 may be performed in accordance with examples as disclosed herein. In some examples, aspects of the operations of 1635 may be performed by an PHY layer signature manager 825 as described with reference to FIG. 8.

Figure 17:
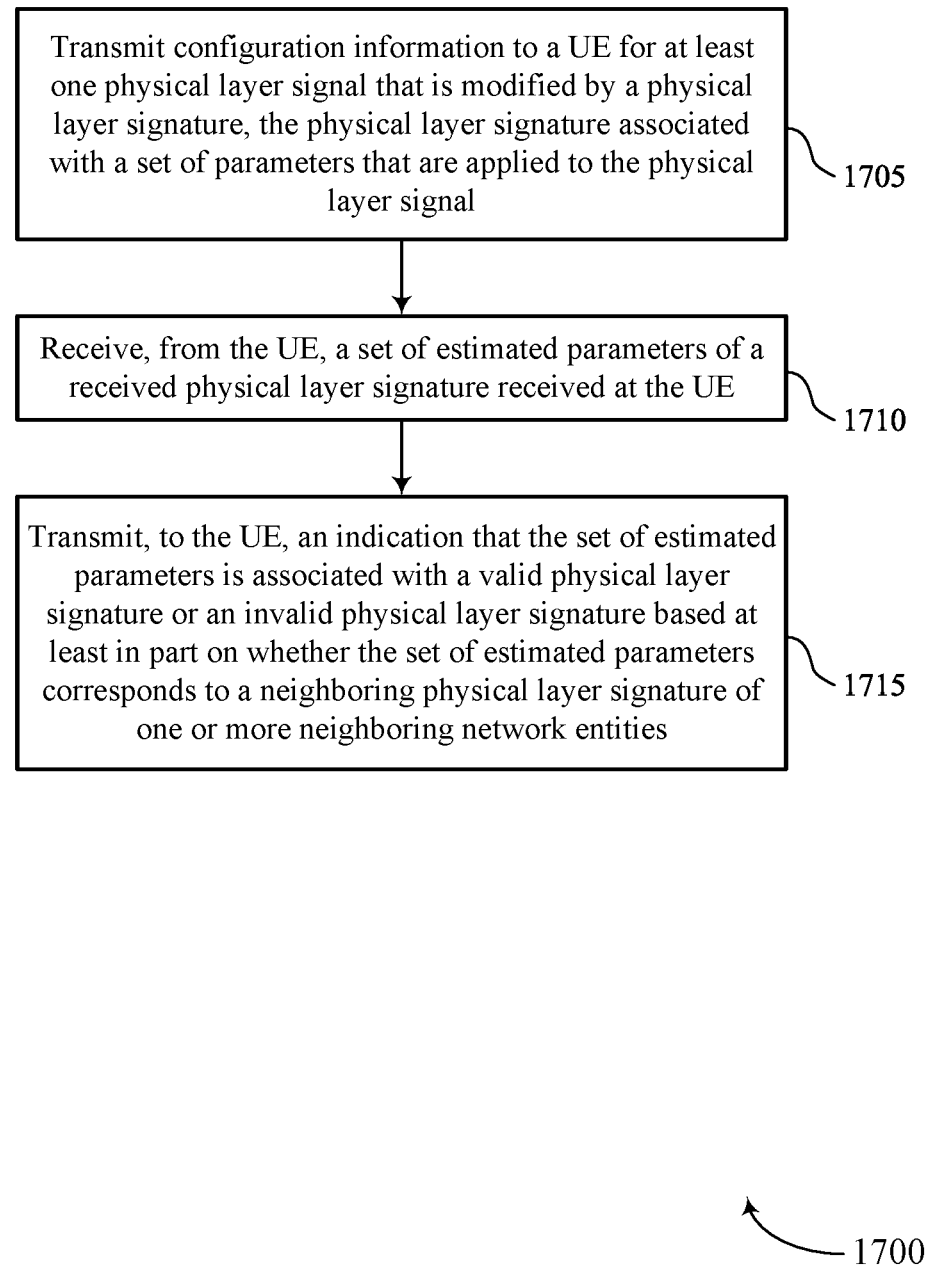

FIG. 17 shows a flowchart illustrating a method 1700 that supports techniques for configuring physical layer signature feedback in wireless communications in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting configuration information to a UE for at least one physical layer signal that is modified by a physical layer signature, the physical layer signature associated with a set of parameters that are applied to the physical layer signal. The operations of 1705 may be performed in accordance with examples as disclosed herein. In some examples, aspects of the operations of 1705 may be performed by an PHY layer signature manager 1225 as described with reference to FIG. 12.

At 1710, the method may include receiving, from the UE, a set of estimated parameters of a received physical layer signature received at the UE. The operations of 1710 may be performed in accordance with examples as disclosed herein. In some examples, aspects of the operations of 1710 may be performed by a parameter estimation manager 1230 as described with reference to FIG. 12.

At 1715, the method may include transmitting, to the UE, an indication that the set of estimated parameters is associated with a valid physical layer signature or an invalid physical layer signature based on whether the set of estimated parameters corresponds to a neighboring physical layer signature of one or more neighboring network entities. The operations of 1715 may be performed in accordance with examples as disclosed herein. In some examples, aspects of the operations of 1715 may be performed by a signature verification manager 1235 as described with reference to FIG. 12.

Figure 18:
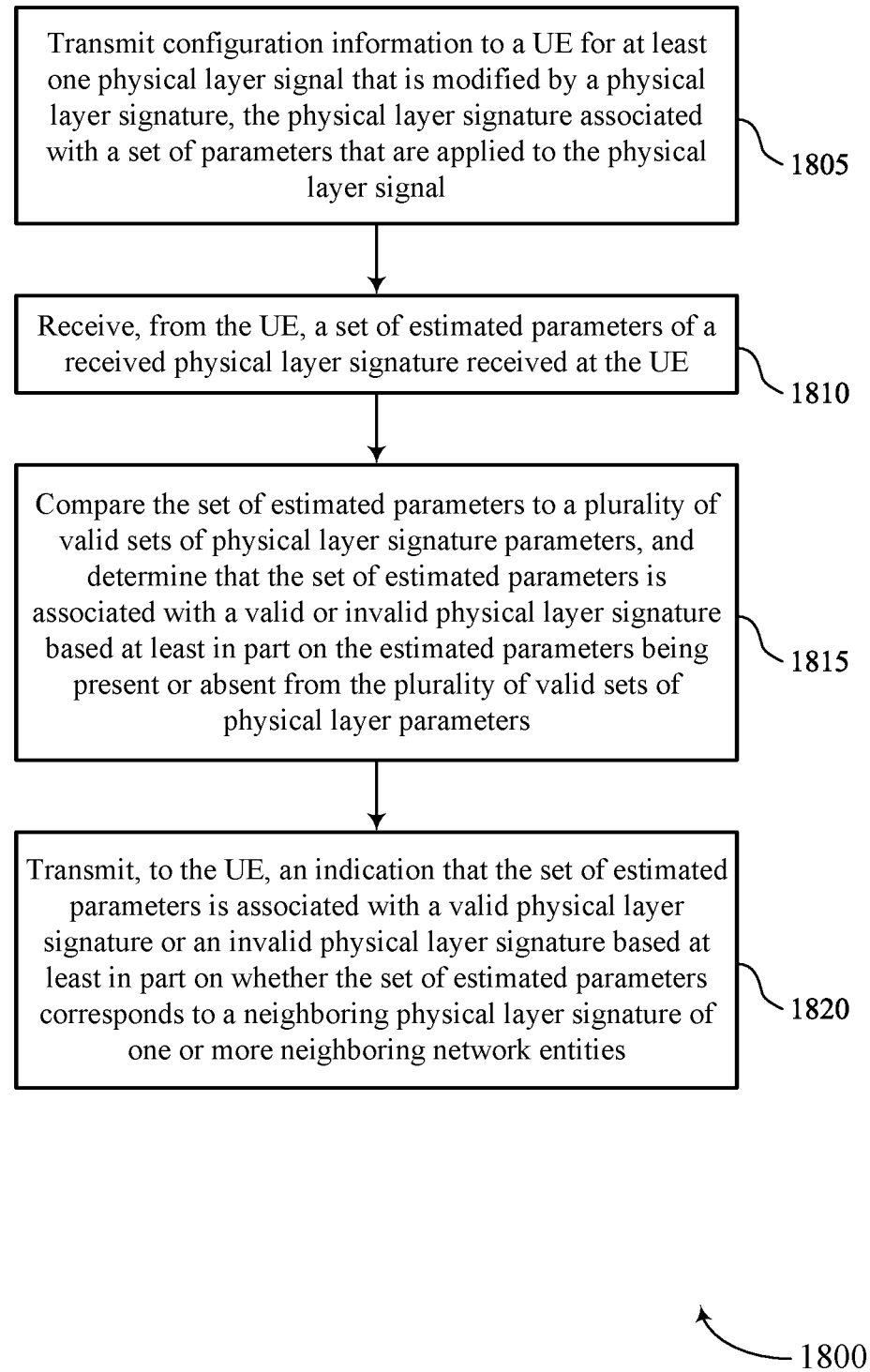

FIG. 18 shows a flowchart illustrating a method 1800 that supports techniques for configuring physical layer signature feedback in wireless communications in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include transmitting configuration information to a UE for at least one physical layer signal that is modified by a physical layer signature, the physical layer signature associated with a set of parameters that are applied to the physical layer signal. The operations of 1805 may be performed in accordance with examples as disclosed herein. In some examples, aspects of the operations of 1805 may be performed by an PHY layer signature manager 1225 as described with reference to FIG. 12.

At 1810, the method may include receiving, from the UE, a set of estimated parameters of a received physical layer signature received at the UE. The operations of 1810 may be performed in accordance with examples as disclosed herein. In some examples, aspects of the operations of 1810 may be performed by a parameter estimation manager 1230 as described with reference to FIG. 12.

At 1815, the method may include comparing the set of estimated parameters to a plurality of valid sets of physical layer signature parameters, and determining that the set of estimated parameters is associated with a valid or invalid physical layer signature based at least in part on the estimated parameters being present or absent from the plurality of valid sets of physical layer parameters. The operations of 1815 may be performed in accordance with examples as disclosed herein. In some examples, aspects of the operations of 1815 may be performed by a signature verification manager 1235 as described with reference to FIG. 12.

At 1820, the method may include transmitting, to the UE, an indication that the set of estimated parameters is associated with a valid physical layer signature or an invalid physical layer signature based on whether the set of estimated parameters corresponds to a neighboring physical layer signature of one or more neighboring network entities. The operations of 1820 may be performed in accordance with examples as disclosed herein. In some examples, aspects of the operations of 1820 may be performed by a signature verification manager 1235 as described with reference to FIG. 12.

Figure 19:
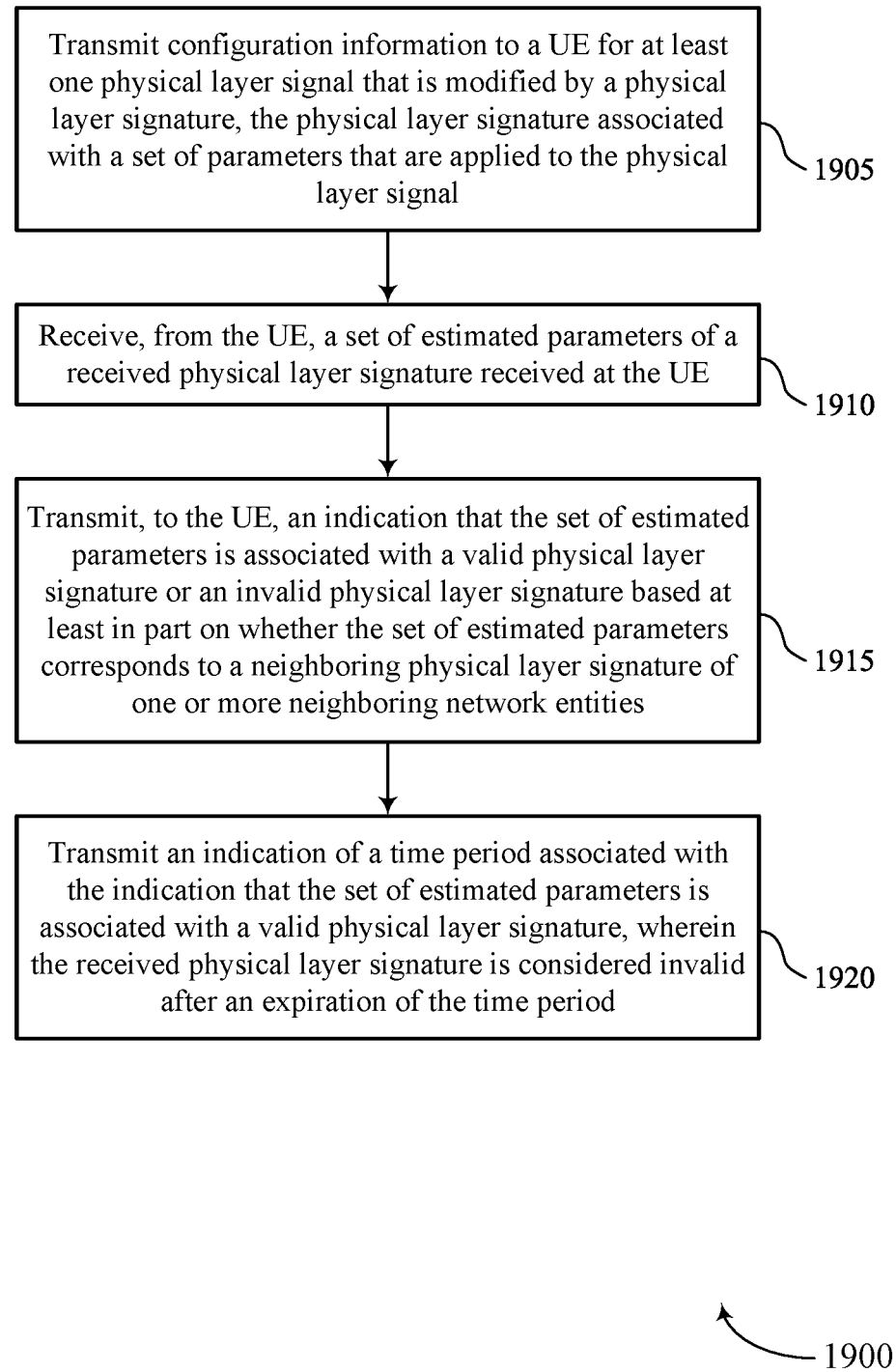

FIG. 19 shows a flowchart illustrating a method 1900 that supports techniques for configuring physical layer signature feedback in wireless communications in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include transmitting configuration information to a UE for at least one physical layer signal that is modified by a physical layer signature, the physical layer signature associated with a set of parameters that are applied to the physical layer signal. The operations of 1905 may be performed in accordance with examples as disclosed herein. In some examples, aspects of the operations of 1905 may be performed by an PHY layer signature manager 1225 as described with reference to FIG. 12.

At 1910, the method may include receiving, from the UE, a set of estimated parameters of a received physical layer signature received at the UE. The operations of 1910 may be performed in accordance with examples as disclosed herein.

In some examples, aspects of the operations of 1910 may be performed by a parameter estimation manager 1230 as described with reference to FIG. 12.

At 1915, the method may include transmitting, to the UE, an indication that the set of estimated parameters is associated with a valid physical layer signature or an invalid physical layer signature based on whether the set of estimated parameters corresponds to a neighboring physical layer signature of one or more neighboring network entities. The operations of 1915 may be performed in accordance with examples as disclosed herein. In some examples, aspects of the operations of 1915 may be performed by a signature verification manager 1235 as described with reference to FIG. 12.

At 1920, the method may include transmitting an indication of a time period associated with the indication that the set of estimated parameters is associated with a valid physical layer signature, where the received physical layer signature is considered invalid after an expiration of the time period. The operations of 1920 may be performed in accordance with examples as disclosed herein. In some examples, aspects of the operations of 1920 may be performed by a signature verification manager 1235 as described with reference to FIG. 12.

The following provides an overview of aspects of the present disclosure:

Aspect 1: A method for wireless communication at a UE, comprising: receiving configuration information for at least one physical layer signal that is modified by a physical layer signature, the physical layer signature is associated with a set of parameters that are applied to the physical layer signal; generating a set of estimated parameters of a received physical layer signature of a received physical layer signal; identifying a mismatch between the set of estimated parameters of the received physical layer signature and the set of parameters provided in the configuration information; and transmitting, based at least in part on the identified mismatch, the set of estimated parameters of the received physical layer signature to a network entity.

Aspect 2: The method of aspect 1, further comprising: comparing the set of estimated parameters of the received physical layer signature to a plurality of valid sets of physical layer signature parameters, and wherein the set of estimated parameters is transmitted to the network entity based at least in part on the set of estimated parameters being absent from the plurality of valid sets of physical layer parameters.

Aspect 3: The method of any of aspects 1 through 2, wherein the transmitting the set of estimated parameters of the received physical layer signature comprises: transmitting a MAC control element, or RRC signaling, that indicates the set of estimated parameters of the received physical layer signature.

Aspect 4: The method of any of aspects 1 through 3, wherein the set of estimated parameters of the received physical layer signature include one or more amplitude parameters, one or more phase parameters, one or more frequency parameters, or any combinations thereof.

Aspect 5: The method of aspect 4, wherein the set of estimated parameters include one or more of an amplitude vector of an AM/AM physical layer signature applied to the received physical layer signal, a phase vector of an AM/PM physical layer signature applied to the received physical layer signal, a set of vectors of impulse responses of a FDRSB estimation of the received physical layer signal, or any combinations thereof.

Aspect 6: The method of any of aspects 1 through 5, wherein the set of estimated parameters include an indication of a resource allocation associated with the received physical layer signal.

Aspect 7: The method of aspect 6, wherein the indication of the resource allocation associated with the received physical layer signal includes one or more of a system frame number, a subframe number, a slot index, a symbol index, a BWP, an RB offset within the BWP, a number of RBs, a receive beam index, or any combinations thereof.

Aspect 8: The method of any of aspects 1 through 7, wherein the set of estimated parameters are provided for verification at the network entity of a validity of the received physical layer signal.

Aspect 9: The method of any of aspects 1 through 8, further comprising: receiving, from the network entity, an indication that the received physical layer signature is a valid signature or an invalid signature.

Aspect 10: The method of aspect 9, further comprising: receiving, from the network entity, an indication of a time period associated with the indication that the received physical layer signature is a valid signature, wherein the received physical layer signature is considered invalid after an expiration of the time period.

Aspect 11: The method of any of aspects 9 through 10, further comprising: adding the received physical layer signature to a list of valid physical layer signatures at the UE.

Aspect 12: A method for wireless communication at a network entity, comprising: transmitting configuration information to a UE for at least one physical layer signal that is modified by a physical layer signature, the physical layer signature associated with a set of parameters that are applied to the physical layer signal; receiving, from the UE, a set of estimated parameters of a received physical layer signature received at the UE; and transmitting, to the UE, an indication that the set of estimated parameters is associated with a valid physical layer signature or an invalid physical layer signature based at least in part on whether the set of estimated parameters corresponds to a neighboring physical layer signature of one or more neighboring network entities.

Aspect 13: The method of aspect 12, further comprising: comparing the set of estimated parameters to a plurality of valid sets of physical layer signature parameters, and wherein the indication that the set of estimated parameters is associated with an invalid physical layer signature is based at least in part on the estimated parameters being absent from the plurality of valid sets of physical layer parameters.

Aspect 14: The method of any of aspects 12 through 13, wherein the receiving set of estimated parameters comprises: receiving a MAC control element, or RRC signaling, that indicates the set of estimated parameters.

Aspect 15: The method of any of aspects 12 through 14, wherein the set of estimated parameters of the received physical layer signature include one or more of an amplitude vector of an AM/AM physical layer signature applied to the received physical layer signal, a phase vector of an AM/PM physical layer signature applied to the received physical layer signal, a set of vectors of impulse responses of a FDRSB estimation of the received physical layer signal, or any combinations thereof Aspect 16: The method of any of aspects 12 through 15, wherein the estimated physical layer signature parameters include an indication of a resource allocation associated with the received physical layer signature received at the UE.

Aspect 17: The method of aspect 16, wherein the indication of the resource allocation associated with the received physical layer signature received at the UE includes one or more of a system frame number, a subframe number, a slot index, a symbol index, a BWP, an RB offset within the BWP, a number of RBs, a receive beam index, or any combinations thereof.

Aspect 18: The method of any of aspects 12 through 17, further comprising: transmitting an indication of a time period associated with the indication that the set of estimated parameters is associated with a valid physical layer signature, wherein the received physical layer signature is considered invalid after an expiration of the time period.

Aspect 19: An apparatus for wireless communication at a UE, comprising a processor; memory coupled with the processor; and instructions stored in the memory and executable by the processor to cause the apparatus to perform a method of any of aspects 1 through 11.

Aspect 20: An apparatus for wireless communication at a UE, comprising at least one means for performing a method of any of aspects 1 through 11.

Aspect 21: A non-transitory computer-readable medium storing code for wireless communication at a UE, the code comprising instructions executable by a processor to perform a method of any of aspects 1 through 11.

Aspect 22: An apparatus for wireless communication at a network entity, comprising a processor; memory coupled with the processor; and instructions stored in the memory and executable by the processor to cause the apparatus to perform a method of any of aspects 12 through 18.

Aspect 23: An apparatus for wireless communication at a network entity, comprising at least one means for performing a method of any of aspects 12 through 18.

Aspect 24: A non-transitory computer-readable medium storing code for wireless communication at a network entity, the code comprising instructions executable by a processor to perform a method of any of aspects 12 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    receiving configuration information for at least one physical layer signal that is modified by a physical layer signature, the physical layer signature is associated with a set of parameters that are applied to the physical layer signal;
    generating a set of estimated parameters of a received physical layer signature of a received physical layer signal;
    identifying a mismatch between the set of estimated parameters of the received physical layer signature and the set of parameters provided in the configuration information; and
    transmitting, based at least in part on the identified mismatch, an indication of the mismatch to a network entity, the indication of the mismatch including the set of estimated parameters of the received physical layer signature.

2. The method of claim 1, further comprising:
    comparing the set of estimated parameters of the received physical layer signature to a plurality of valid sets of physical layer signature parameters, and wherein the set of estimated parameters is transmitted to the network entity based at least in part on the set of estimated parameters being absent from the plurality of valid sets of physical layer parameters.

3. The method of claim 1, wherein the transmitting the set of estimated parameters of the received physical layer signature comprises:
    transmitting a medium access control (MAC) control element, or radio resource control (RRC) signaling, that indicates the set of estimated parameters of the received physical layer signature.

4. The method of claim 1, wherein the set of estimated parameters of the received physical layer signature include one or more amplitude parameters, one or more phase parameters, one or more frequency parameters, or any combinations thereof.

5. The method of claim 4, wherein the set of estimated parameters include one or more of an amplitude vector of an amplitude-to-amplitude modulation (AM/AM) physical layer signature applied to the received physical layer signal, a phase vector of an amplitude-to-phase modulation (AM/PM) physical layer signature applied to the received physical layer signal, a set of vectors of impulse responses of a frequency domain residual sideband (FDRSB) estimation of the received physical layer signal, or any combinations thereof.

6. The method of claim 1, wherein the set of estimated parameters include an indication of a resource allocation associated with the received physical layer signal.

7. The method of claim 6, wherein the indication of the resource allocation associated with the received physical layer signal includes one or more of a system frame number, a subframe number, a slot index, a symbol index, a bandwidth part (BWP), a resource block (RB) offset within the BWP, a number of RBs, a receive beam index, or any combinations thereof.

8. The method of claim 1, wherein the set of estimated parameters are provided for verification at the network entity of a validity of the received physical layer signal.

9. The method of claim 1, further comprising:
    receiving, from the network entity, an indication that the received physical layer signature is a valid signature or an invalid signature.

10. The method of claim 9, further comprising:
    receiving, from the network entity, an indication of a time period associated with the indication that the received physical layer signature is a valid signature, wherein the received physical layer signature is considered invalid after an expiration of the time period.

11. The method of claim 9, further comprising:
    adding the received physical layer signature to a list of valid physical layer signatures at the UE.

12. A method for wireless communication at a network entity, comprising:
    transmitting configuration information to a user equipment (UE) for at least one physical layer signal that is modified by a physical layer signature, the physical layer signature associated with a set of parameters that are applied to the physical layer signal;

receiving, from the UE, an indication of a mismatch between a set of estimated parameters of a received physical layer signature received at the UE and the set of parameters provided in the configuration information; and transmitting, to the UE, an indication that the set of estimated parameters is associated with a valid physical layer signature or an invalid physical layer signature based at least in part on whether the set of estimated parameters corresponds to a neighboring physical layer signature of one or more neighboring network entities.

13. The method of claim 12, further comprising:
comparing the set of estimated parameters to a plurality of valid sets of physical layer signature parameters, and wherein the indication that the set of estimated parameters is associated with an invalid physical layer signature is based at least in part on the estimated parameters being absent from the plurality of valid sets of physical layer parameters.

14. The method of claim 12, wherein the receiving the set of estimated parameters comprises:
receiving a medium access control (MAC) control element, or radio resource control (RRC) signaling, that indicates the set of estimated parameters.

15. The method of claim 12, wherein the set of estimated parameters of the received physical layer signature include one or more of an amplitude vector of an amplitude-to-amplitude modulation (AM/AM) physical layer signature applied to the received physical layer signal, a phase vector of an amplitude-to-phase modulation (AM/PM) physical layer signature applied to the received physical layer signal, a set of vectors of impulse responses of a frequency domain residual sideband (FDRSB) estimation of the received physical layer signal, or any combinations thereof.

16. The method of claim 12, wherein the estimated physical layer signature parameters include an indication of a resource allocation associated with the received physical layer signature received at the UE.

17. The method of claim 16, wherein the indication of the resource allocation associated with the received physical layer signature received at the UE includes one or more of a system frame number, a subframe number, a slot index, a symbol index, a bandwidth part (BWP), a resource block (RB) offset within the BWP, a number of RBs, a receive beam index, or any combinations thereof.

18. The method of claim 12, further comprising:
transmitting an indication of a time period associated with the indication that the set of estimated parameters is associated with a valid physical layer signature, wherein the received physical layer signature is considered invalid after an expiration of the time period.

19. An apparatus for wireless communication at a user equipment (UE), comprising:
a processor,
memory coupled with the processor; and
instructions stored in the memory and executable by the processor to cause the apparatus to:
receive configuration information for at least one physical layer signal that is modified by a physical layer signature, the physical layer signature is associated with a set of parameters that are applied to the physical layer signal;
generate a set of estimated parameters of a received physical layer signature of a received physical layer signal;
identify a mismatch between the set of estimated parameters of the received physical layer signature and the set of parameters provided in the configuration information; and
transmit, based at least in part on the identified mismatch, an indication of the mismatch to a network entity, the indication of the mismatch including the set of estimated parameters of the received physical layer signature.

20. The apparatus of claim 19, wherein the instructions are further executable by the processor to cause the apparatus to:
compare the set of estimated parameters of the received physical layer signature to a plurality of valid sets of physical layer signature parameters, and wherein the set of estimated parameters is transmitted to the network entity based at least in part on the set of estimated parameters being absent from the plurality of valid sets of physical layer parameters.

21. The apparatus of claim 19, wherein the set of estimated parameters of the received physical layer signature include one or more amplitude parameters, one or more phase parameters, one or more frequency parameters, or any combinations thereof.

22. The apparatus of claim 21, wherein the set of estimated parameters include one or more of an amplitude vector of an amplitude-to-amplitude modulation (AM/AM) physical layer signature applied to the received physical layer signal, a phase vector of an amplitude-to-phase modulation (AM/PM) physical layer signature applied to the received physical layer signal, a set of vectors of impulse responses of a frequency domain residual sideband (FDRSB) estimation of the received physical layer signal, or any combinations thereof.

23. The apparatus of claim 19, wherein the instructions are further executable by the processor to cause the apparatus to:
receive, from the network entity, an indication that the received physical layer signature is a valid signature or an invalid signature.

24. The apparatus of claim 23, wherein the instructions are further executable by the processor to cause the apparatus to:
receive, from the network entity, an indication of a time period associated with the indication that the received physical layer signature is a valid signature, wherein the received physical layer signature is considered invalid after an expiration of the time period.

25. The apparatus of claim 23, wherein the instructions are further executable by the processor to cause the apparatus to:
add the received physical layer signature to a list of valid physical layer signatures at the UE.

26. An apparatus for wireless communication at a network entity, comprising:
a processor;
memory coupled with the processor; and
instructions stored in the memory and executable by the processor to cause the apparatus to:
transmit configuration information to a user equipment (UE) for at least one physical layer signal that is modified by a physical layer signature, the physical layer signature associated with a set of parameters that are applied to the physical layer signal;
receive, from the UE, an indication of a mismatch between a set of estimated parameters of a received physical layer signature received at the UE and the set of parameters provided in the configuration information; and transmit, to the UE, an indication that the set of estimated parameters is associated with a valid physical layer signature or an invalid physical layer signature based at least in part on whether the set of estimated parameters corresponds to a neighboring physical layer signature of one or more neighboring network entities.

27. The apparatus of claim 26, wherein the instructions are further executable by the processor to cause the apparatus to:

compare the set of estimated parameters to a plurality of valid sets of physical layer signature parameters, and wherein the indication that the set of estimated parameters is associated with an invalid physical layer signature is based at least in part on the estimated parameters being absent from the plurality of valid sets of physical layer parameters.

28. The apparatus of claim 26, wherein the set of estimated parameters of the received physical layer signature include one or more of an amplitude vector of an amplitude-to-amplitude modulation (AM/AM) physical layer signature applied to the received physical layer signal, a phase vector of an amplitude-to-phase modulation (AM/PM) physical layer signature applied to the received physical layer signal, a set of vectors of impulse responses of a frequency domain residual sideband (FDRSB) estimation of the received physical layer signal, or any combinations thereof.

29. The apparatus of claim 26, wherein the estimated physical layer signature parameters include an indication of a resource allocation associated with the received physical layer signature received at the UE.

30. The apparatus of claim 29, wherein the indication of the resource allocation associated with the received physical layer signature received at the UE includes one or more of a system frame number, a subframe number, a slot index, a symbol index, a bandwidth part (BWP), a resource block (RB) offset within the BWP, a number of RBs, a receive beam index, or any combinations thereof.

* * * * *